(12) United States Patent
Masuda

(10) Patent No.: US 11,163,107 B2
(45) Date of Patent: Nov. 2, 2021

(54) LIGHTING DEVICE AND DISPLAY DEVICE

(71) Applicant: SHARP KABUSHIKI KAISHA, Sakai (JP)

(72) Inventor: Junichi Masuda, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/185,139

(22) Filed: Feb. 25, 2021

(65) Prior Publication Data

US 2021/0286117 A1    Sep. 16, 2021

(30) Foreign Application Priority Data

Mar. 10, 2020 (JP) .............................. JP2020-040693

(51) Int. Cl.
*F21V 8/00* (2006.01)

(52) U.S. Cl.
CPC ........... *G02B 6/009* (2013.01); *G02B 6/0068* (2013.01); *G02B 6/0076* (2013.01)

(58) Field of Classification Search
CPC .. G02F 1/133617; G02B 6/0028; G02B 6/009
See application file for complete search history.

(56) References Cited

U.S. PATENT DOCUMENTS

| 10,234,621 | B2 * | 3/2019 | Park | G02B 6/0076 |
| 2018/0074249 | A1 | 3/2018 | Hirasawa | |
| 2019/0196089 | A1 * | 6/2019 | Park | G02B 6/0028 |
| 2020/0073047 | A1 * | 3/2020 | Jeong | G02B 6/009 |

FOREIGN PATENT DOCUMENTS

WO    2016/163176 A1    10/2016

* cited by examiner

*Primary Examiner* — Matthew J. Peerce
(74) *Attorney, Agent, or Firm* — ScienBiziP, P.C.

(57) ABSTRACT

A lighting device includes first light sources of a first row having first light emission surfaces and second light sources of a second row having second light emission surfaces, a first light guide plate including a first light entering edge surface that is opposite the first light emission surfaces, a second light guide plate including a second light entering edge surface that is opposite the second light emission surfaces, and a vertical dimension of the first light emission surfaces is greater than a thickness dimension of the first and second light guide plates and the vertical dimension of the second light emission surface is equal to or greater than the thickness dimension. The first light sources and the second light sources are arranged alternately in an extending direction of the light entering edges and portions of the first light emission surfaces are opposite the second light entering edge surface.

11 Claims, 21 Drawing Sheets

FIG.21
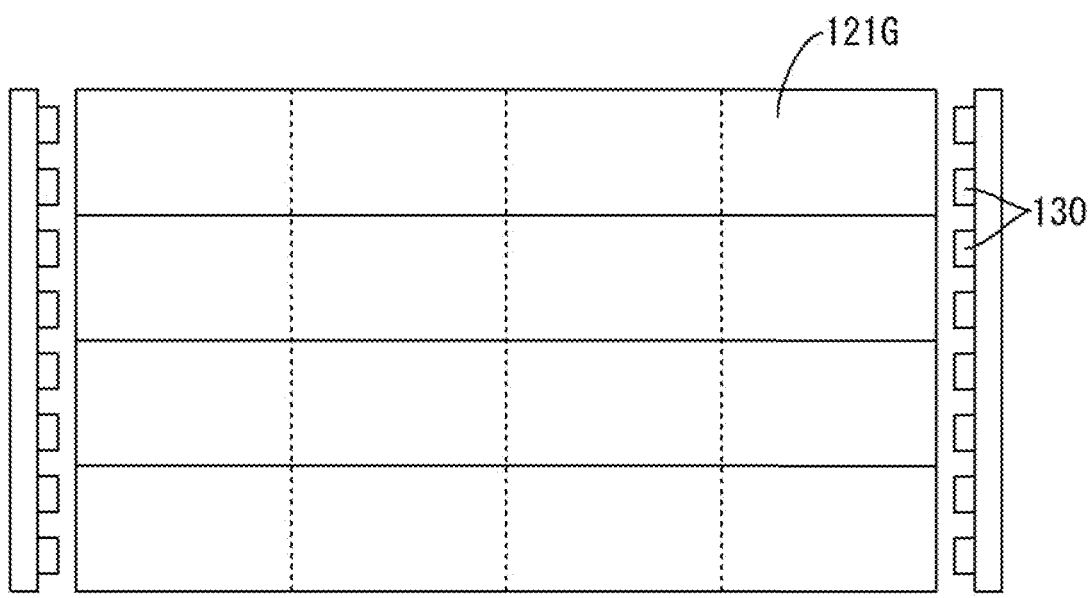
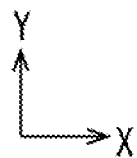

LIGHTING DEVICE AND DISPLAY DEVICE

CROSS REFERENCE TO RELATED APPLICATION

This application claims priority from Japanese Patent Application No. 2020-40693 filed on Mar. 10, 2020. The entire contents of the priority application are incorporated herein by reference.

TECHNICAL FIELD

The present technology described in this specification relates to a lighting device and a display device.

BACKGROUND

A liquid crystal display device including a liquid crystal panel has been used as a display device included in mobile terminal devices such as tablet computers, digital cameras, and smartphones. The liquid crystal panel does not emit light and necessarily uses external light for displaying an image. Therefore, such a type of display device includes a lighting device (so-called backlight unit) other than the liquid crystal panel for supplying light to the liquid crystal panel. Such a lighting device is arranged on a back surface side of the liquid crystal panel and is configured to supply planar light, which spreads in a planar form, to the back surface of the liquid crystal panel.

Technology of high dynamic range (HDR) display that broadens brightness contrast has been proposed for improving image display quality of the liquid crystal display device. In the liquid crystal display device to which such a technology is applied, it is preferable to control brightness for each of the display areas with the so-called local dimming technology.

The backlight unit is generally classified into a direct type and an edge light type according to arrangement of a light source. The direct type backlight unit includes the light source directly below a display surface of the liquid crystal panel. The edge light type backlight unit includes the light source beside the liquid crystal panel. The liquid crystal display device has been strongly demanded to be thinner and the edge light type backlight unit is preferably used to achieve further decrease of thickness. There has been known a backlight unit of the edge light type with the local dimming technology.

However, in the edge light type backlight unit, the light emission area cannot be divided into small areas because of the arrangement of the light source unlike a direct type one. In the edge light type backlight unit, an area of a light emission surface of the light source such as an LED is equal to or smaller than an area of an edge surface (a light entering surface) of a light guide plate that is disposed opposite the LED. Therefore, if an LED having high output power and a large light emission area is used to enhance brightness, the light guide plate is increased in thickness. If a thin light guide plate is used to reduce the thickness, only an LED having a small size and low output power can be used. Therefore, high brightness and small thickness in the backlight unit are less likely to be achieved at the same time.

SUMMARY

An object of the technology disclosed in this specification is to provide a lighting device and a display device that can be used for local dimming and achieve reduced thickness and high brightness.

The technology disclosed in this specification is a lighting device including light sources having light emission surfaces through which light is emitted, and a light guide plate group including a first light guide plate and a second light guide plate that are disposed on top of each other in a thickness direction of the first light guide plate and the second light guide plate. The light sources include first light sources included in a first light source row and having first light emission surfaces and second light sources included in a second light source row and having second light emission surfaces. The first light guide plate includes a first light entering edge surface that is opposite the first light emission surfaces of the first light sources and through which the light from the first light sources enters. The second light guide plate includes a second light entering edge surface that is opposite the second light emission surfaces of the second light sources and through which the light from the second light sources enters. The first light entering edge surface and the second light entering edge surface face a same direction and extend in an extending direction. The first light source row and the second light source row extend in the extending direction and are arranged parallel to each other. Each of the first light emission surfaces and the second light emission surfaces has a vertical dimension extending in the thickness direction and the vertical dimension of the first light emission surfaces is greater than a thickness dimension of the first light guide plate and the second light guide plate and the vertical dimension of the second light emission surface is equal to or greater than the thickness dimension of the first light guide plate and the second light guide plate. The first light sources and the second light sources are arranged alternately in the extending direction and portions of the first light emission surfaces are opposite the second light entering edge surface.

According to the technology described herein, a lighting device and a display device that can be used for local dimming and achieve reduced thickness and high brightness can be obtained.

BRIEF DESCRIPTION OF THE DRAWINGS

FIG. 21 is a plan view illustrating a light guide plate group and LEDs according to another embodiment.

DETAILED DESCRIPTION

First Embodiment

Figure 1:
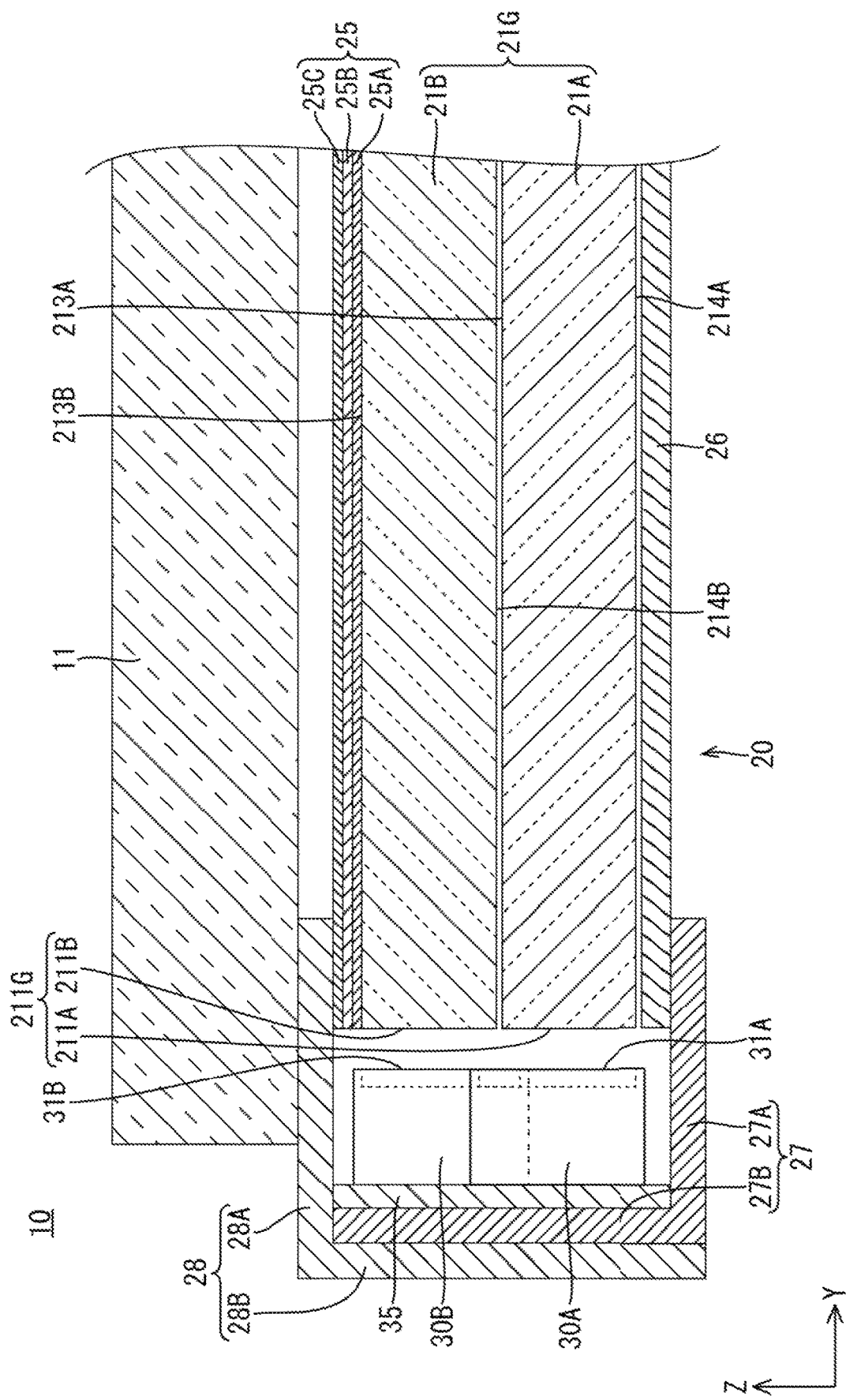
FIG. 1 is an enlarged cross-sectional view of a portion of a liquid crystal display device according to a first embodiment.

A first embodiment will be described with reference to FIGS. 1 to 7. In the present embodiment, a liquid crystal display device (a display device) 10 including a liquid crystal panel 11 as a display panel will be described. X-axis, Y-axis and Z-axis may be indicated in each of the drawings. The axes in each drawing correspond to the respective axes in other drawings. A vertical direction is illustrated with reference to FIG. 1 and an upper side and a lower side correspond to a front side and a back side, respectively. One of the same components is indicated by a symbol and other components may not be indicated by the symbols and will not be described.

The liquid crystal display device 10 has a rectangular flat box shape as a whole and includes a liquid crystal panel (an example of a display panel) 11 and a backlight unit (an example of a lighting device) 20. The liquid crystal panel 11 is configured to display images. The backlight unit 20 is arranged on a back side of the liquid crystal panel 11 and supplies light for display to the liquid crystal panel 11. The liquid crystal panel 11 and the backlight unit 20 are integrally held by a fixing tape. The liquid crystal display device 10 according to this embodiment may be used in various kinds of electronic devices such as portable information terminals (for example, mobile phones, smartphones, tablet computers), information terminals for vehicles (for example, built-in car navigation system, portable car navigation system), and portable video game players.

The liquid crystal panel 11 has a known configuration and includes a pair of rectangular substrates that are bonded to each other while having a predetermined gap therebetween and a liquid crystal layer between the substrates. Each of the substrates includes a glass substrate having high transmissivity such as non-alkaline glass and fused quartz and includes multiple films layered on each glass substrate with the known photolithography method.

One of the pair of the substrates on the rear (on a lower side in FIG. 1) is an array substrate and switching components (such as TFTs), pixel electrodes, and an alignment film and other films are arranged are arranged on the array substrate. The switching components are connected to source lines and gate lines that are perpendicular to each other. The pixel electrodes are connected to the switching components. The other one of the substrates on the front (on an upper side in FIG. 1) is a CF substrate. Color filters, a counter electrode, and an alignment film are arranged on the CF substrate. The color filters include color portions of red (R), green (G), and blue (B) that are arranged with predetermined alignment. The source lines, the gate lines, and the counter electrode are supplied with image data and various kinds of control signals that are necessary for displaying images from a control circuit board. Polarizing plates are bonded to outer surfaces of the substrates, respectively.

The liquid crystal panel 11 displays images thereon with using light supplied by the backlight unit 20 and a front side thereof is a light exit side. A long-side direction, a short-side direction, and a thickness direction of the liquid crystal panel 11 match the X-axis direction, the Y-axis direction and the Z-axis direction, respectively.

The backlight unit 20 has substantially a block-like shape having a laterally elongated rectangular planar shape as a whole similar to the liquid crystal panel 11. The backlight unit 20 includes multiple light emitting diodes 30 (LEDs), which are a light source, an LED board 35, a light guide plate group 21G, an optical sheet 25, a reflection sheet 26, a chassis 27, and a frame 28. The LEDs 30 are mounted on the LED board 35. Light that is emitted by the LEDs 30 travels within the light guide plate group 21G. The optical sheet 25 is disposed on a front surface side of the light guide plate group 21G. The reflection sheet 26 is disposed on a back surface side of the light guide plate group 21G. The chassis 27 has a rectangular shallow bowl shape and the above components are collectively arranged in the chassis 27. The frame 28 has a frame shape and extends along an outer edge of the chassis 27.

Figure 2:
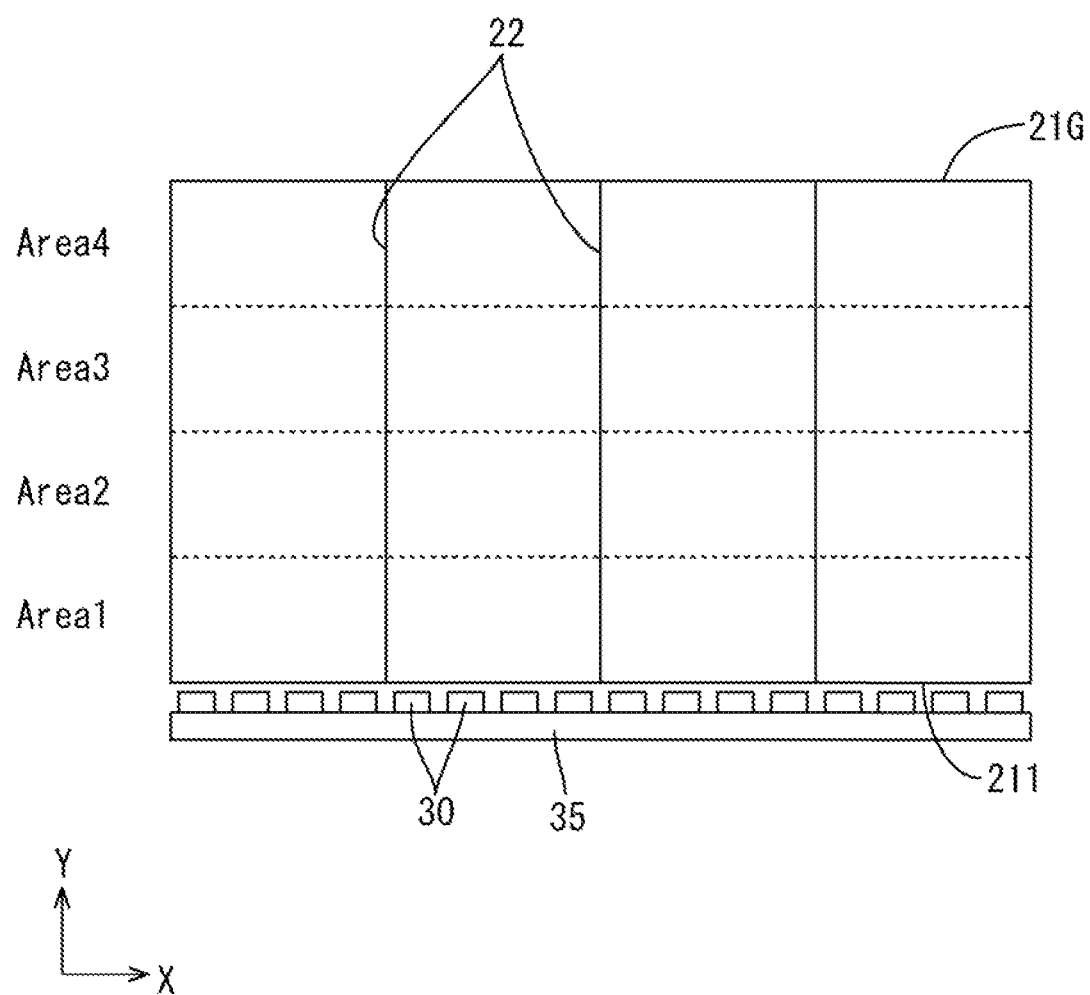
FIG. 2 is a plan view of a light guide plate group and LEDs.

As illustrated in FIGS. 1 and 2, the backlight unit 20 is an edge light type (a side-light type) backlight unit of one-side light entering type in which light from the LEDs 30 enters the light guide plate group 21G through one long-side edge surface thereof. In the backlight unit 20, the light from the LEDs 30 is converted by the light guide plate group 21G into planar light and the converted light exits toward the liquid crystal panel 11 on the front side. The front side of the backlight unit 20 is a light exit side. Hereinafter, components of the backlight unit 20 will be described sequentially.

First, the light guide plate group 21G will be described. The light guide plate group 21G of this embodiment includes two light guide plates 21. The light guide plates 21 include a first light guide plate 21A that is disposed on a relatively back side and a second light guide plate 21B that is disposed on a relatively front side. The first light guide plate 21A and the second light guide plate 21B are rectangular plates of the same shape and the same size and are overlapped with each other in a plan view over entire areas thereof. As illustrated in FIG. 2, the light guide plate group 21G is arranged such that the long side direction, the short side direction, and the thickness direction thereof match the X-axis, the Y-axis, and the Z-axis, respectively.

Hereinafter, each light guide plate 21 is described separately by adding an alphabet of "A" or "B" to the numeral like the first light guide plate 21A or the second light guide plate 21B and only the numeral is used to generally describe the light guide plate 21. A configuration of each of the light guide plates 21A, 21B is described separately by adding the alphabet of "A" or "B" to the numeral and only the numeral is used to generally describe the configuration of the light guide plate 21.

The light guide plate 21 is made of material that has refractive index sufficiently higher than that of air and has high transmissivity. The material may be resin such as transparent acryl or polycarbonate or various kinds of glass. In the present embodiment, two acrylic resin plates are used as the first light guide plate 21A and the second light guide plate 21B.

The first light guide plate 21A is overlapped with the second light guide plate 21B and disposed on a back side of the second light guide plate 21B with respect to the Z-axis direction. The first light guide plate 21A has outer peripheral edge surfaces and one of the outer peripheral edge surfaces on a lower side in FIG. 2 and extending in the X-axis direction is a first light entering edge surface 211A through which the light emitted by the LEDs 30 enters. The first light entering edge surface 211A is vertical to a front side plate surface (a first light exit plate surface 213A, which will be described later) of the first light guide plate 21A and extends along an X-Z surface.

The first light guide plate 21A has a pair of front and back plate surfaces and a front side plate surface (facing the liquid crystal panel 11) is a first light exit plate surface 213A through which the light exits toward the second light guide plate 213B and the liquid crystal panel 11. A back side plate surface is a first light exit opposite plate surface 214A that is an opposite surface from the first light exit plate surface 213A.

The second light guide plate 21B is overlapped with the first light guide plate 21A and disposed on a front side of the first light guide plate 21A with respect to the Z-axis direction. The second light guide plate 21B has outer peripheral edge surfaces and one of the outer peripheral edge surfaces on a lower side in FIG. 2 and extending in the X-axis direction is a second light entering edge surface 211B through which the light emitted by the LEDs 30 enters. The second light entering edge surface 211B is vertical to a front side plate surface (a second light exit plate surface 213B) of the second light guide plate 21B and extends along the X-Z surface. The first light entering edge surface 211A and the second light entering edge surface 211B are overlapped with each other. Namely, the light guide plates 21 are overlapped with each other such that the respective light entering edge surfaces 211 face in the same direction. Accordingly, the LEDs 30 are collectively arranged on one side of the light guide plate group 21G.

The second light guide plate 21B has a pair of front and back plate surfaces and a front side plate surface is a second light exit plate surface 213B through which the light exits toward the liquid crystal panel 11. A back side plate surface is a second light exit opposite plate surface 214B that is an opposite surface from the second light exit plate surface 213B. An entire area of the first light guide plate 21A is covered with the second light exit opposite plate surface 214B.

Accordingly, the light guide plates 21 of the present embodiment are arranged such that the extending direction of the light entering edge surfaces 211 through which the light from the LEDs 30 enters matches the X-axis, the light entering direction matches the Y-axis, and the light exit direction matches the Z-axis.

As illustrated in FIG. 2, each of the first light guide plate 21A and the second light guide plate 21B has grooves 22 extending in the Y-axis direction. Each of the grooves 22 has a V-shaped cross-sectional view and functions as a prism that changes a direction of light that has reached the groove. The light exit plate surface 213 is divided into four regions with respect to the X-axis direction by the grooves 22 and includes belt-shaped divided areas each extending along the Y-axis. The groove 22 is formed such that the light that has travelled within one divided area is less likely to disperse to another divided area that is adjacent to the one divided area. Namely, the groove 22 exerts a closing effect. The groove 22 may be formed at least near a border between the divided areas and may be further formed in another region than the border region.

The first light guide plate 21A and the second light guide plate 21B has an uneven pattern on predefined portions of the light exit opposite plate surfaces 214A and 214B, respectively. The uneven pattern includes lens projections projecting from the light exit opposite plate surface 214 toward the back side. The uneven pattern exerts a function of outputting the light that has travelled within the respective light guide plates 21A and 21B toward an outer side (the light exit plate surface 213 side). In the present embodiment, on the first light exit opposite plate surface 214A of the first light guide plate 21A, the uneven pattern has a higher density as an area of the first light exit opposite plate surface 214A is closer to the first light entering edge surface 211A. On the second light exit opposite plate surface 214B of the second light guide plate 21B, the uneven pattern has a higher density as an area of the second light exit opposite plate surface 214B is farther away from to the second light entering edge surface 211B. According to such a configuration, the light guide plates 21A, 21B have different brightness distributions and the light guide plate group 21G have the local dimming function with which exiting of light can be controlled for each of the divided areas by the combination of the grooves 22 and the uneven pattern. The brightness distributions of the local dimming will be described more in detail.

As illustrated in FIG. 1, the light guide plate group 21G is disposed directly below the liquid crystal panel 11 while having the optical sheets 25 therebetween. The optical sheets 25 are flat rectangular sheets having a same size as that of the light guide plates 21 and are disposed on the second light exit plate surface 213B of the second light guide plate 21B. The long-side direction of the optical sheets 25 matches the X-axis direction and the short-side direction matches the Y-axis direction. The optical sheets 25 are disposed between the second light guide plate 21B and the liquid crystal panel 11. The light that has exited the light guide plate group 21G passes through the optical sheets 25 and exits the optical sheets 25 toward the liquid crystal panel 11 while the optical sheets 25 adding predetermined optical effects on the transmission light. The optical sheets 25 of the present embodiment have a three-layered structure and include a diffuser sheet 25A, a lens sheet 25B, and a reflective-type polarizing sheet 25C that are stacked on each other from a lower layer side in this order.

The first light guide plate 21A has the reflection sheet 26 on the back surface side (on a light exit opposite plate surface 214A side) thereof. The reflection sheet 26 is a flat rectangular sheet having a greater size than that of the first light guide plate 21A. The long-side direction of the reflection sheet 26 matches the X-axis direction and the short-side direction matches the Y-axis direction. The reflection sheet 26 is a sheet made of synthetic resin and having a white surface of high light reflectivity. Therefore, the light that has travelled within the first light guide plate 21A and exited through the light exit opposite plate surface 214A is effectively directed toward the front side (toward the light exit plate surface 213A).

The chassis 27 is, for example, made of metal material such as an aluminum plate and an electrogalvanized steel plate (SECC). The chassis 27 includes a rectangular bottom plate 27A similar to the liquid crystal panel 11 and a wall 27B extending from an entire peripheral edge of the bottom plate 27A toward the front side (the light exit side). As described before, the chassis 27 has a rectangular plan view shape and a shallow box shape opening toward the liquid crystal panel 11 (the front side) as a whole and the light guide plate group 21G is arranged within the chassis 27.

The frame 28 includes a frame section 28A and a wall cover section 28B. The frame section 28A is made of resin such as white polycarbonate having high light reflectivity and is disposed opposite the bottom plate 27A. The frame section 28A has a rectangular frame shape and covers opening edge portion of the chassis 27. The wall cover section 28B extends from the outer peripheral edge portion of the frame section 28A toward the back side and is disposed to surround the wall 27B of the chassis 27. The frame 28 is fixed to the chassis 27 with a fixing tape that is arranged between the frame section 28A and an edge surface of the wall 27B. The liquid crystal panel 11 is fixed to an upper surface of the frame section 28A with a fixing tape.

Next, the LEDs 30 and the LED board 35 will be described. The LED 30 has an LED chip that is a light emission source and is included in a box-shaped casing and sealed with a sealing material. The LED chip has a single main light emission wavelength and emits a single color of blue, for example. The LED chip is connected to wiring on the LED board 35 outside the casing via a lead frame that extends through a wall of the casing. The resin material sealing the LED chip contains yellow phosphors in a dispersed state. The yellow phosphor is excited by blue light emitted by the LED chip and emits white light as a whole.

The LED 30 has a light emission surface 31 facing an opposite side from an LED mount surface of the LED board 35 and is a so-called top surface light emission type LED. The LED 30 emits light through the quadrangular light emission surface 31 such that the light spreads with certain directivity with respect to an optical axis as a center axis. In this embodiment, the light emission surface 31 is square and the optical axis of the emitted light is substantially vertical to a middle section of the light emission surface 31. A greatest amount of the light rays emitted by the LED 30 through the light emission surface 31 travels along the optical axis. The LEDs 30 are arranged such that the light emission surfaces are parallel to and opposite the light entering edge surface 211 of the light guide plate 21. The light emission surface 31 of the LED 30 has a dimension B extending in the short-side direction (Z-axis direction) of the LED board 35, that is the dimension B of the thickness direction of the light guide plate 21, and a dimension A of the thickness of one light guide plate 21. The dimension B is greater than the dimension A (B>A).

The LED board 35 includes a base film made of thermosetting resin such as urethane resin and epoxy resin and wiring for supplying power to the LEDs 30. The wiring is formed on the base film. The LED board 35 further includes a thermoplastic resin layer having a thermoplastic property, such as polyimide resin, on the base film and the LEDs 30 on the thermoplastic resin layer. The LEDs 30 are arranged regularly as will be described later. The LED board 35 is a so-called flexible circuit board. The LED board 35 has a thin elongated belt-like shape and has a long-side dimension substantially same as an extending dimension (in the X-axis direction) of the light entering edge surface 211 of the light guide plate 21. The LED board 35 has a short-side dimension substantially same as a thickness dimension of the light guide plate group 21G. The LED board 35 is fixed to the chassis 27 such that a substantially entire area of a surface of the LED board 35 opposite from the mounting surface is fixed to an inner surface of the wall 27B of the chassis 27 with a fixing tape.

Figure 3:
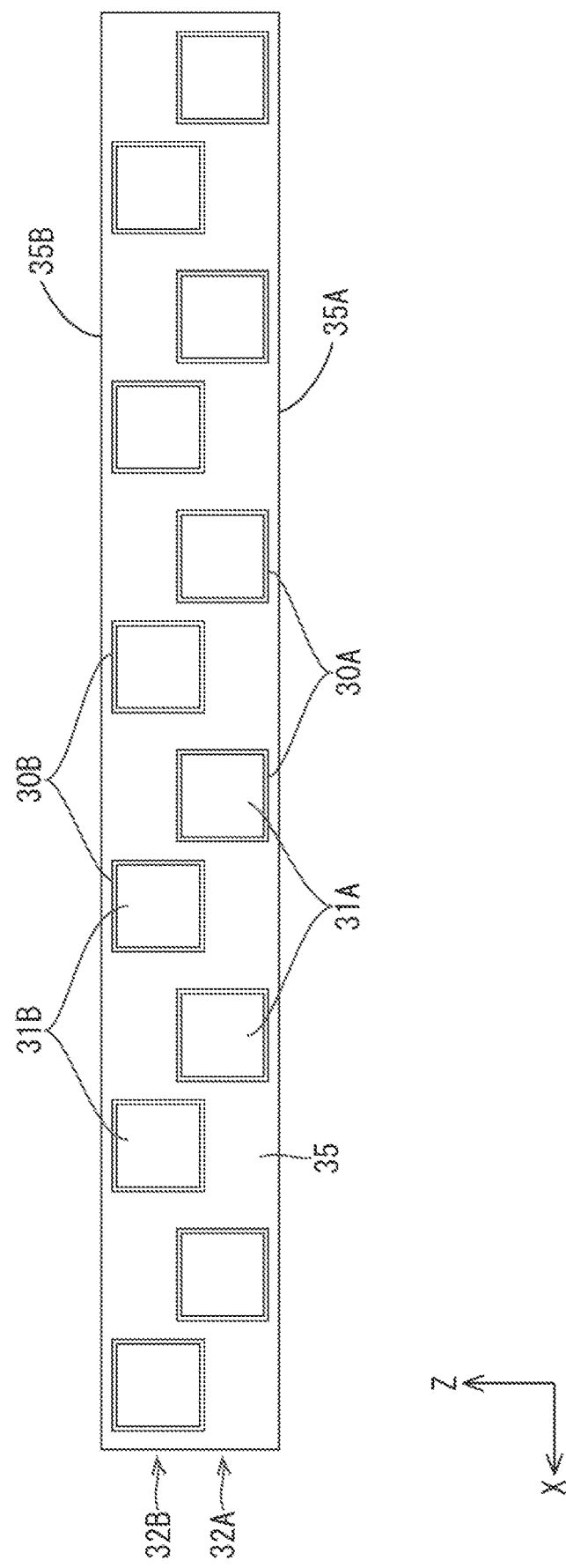
FIG. 3 is a plan view of an LED board.

Next, the mounting configuration of the LEDs 30 on the LED board 35 will be described in detail. The LEDs 30 are arranged in two rows along the long-side direction of the LED board 35. As illustrated in FIG. 3, the LEDs 30 included in the respective two rows are arranged in the long-side direction in a zig-zag manner and do not correspond to each other in the short-side direction of the LED board 35. Hereinafter, the LEDs 30 on one of the two rows (on a lower side in FIG. 3) are referred to as first LEDs 30A and a row of the first LEDs 30A is referred to as a first LED row 32A (one example of a light source row). The LEDs 30 on another one of the two rows (on an upper side in FIG. 3) are referred to as second LEDs 30B and a row of the second LEDs 30B is referred to as a second LED row 32B (one example of a light source row).

Figure 4:
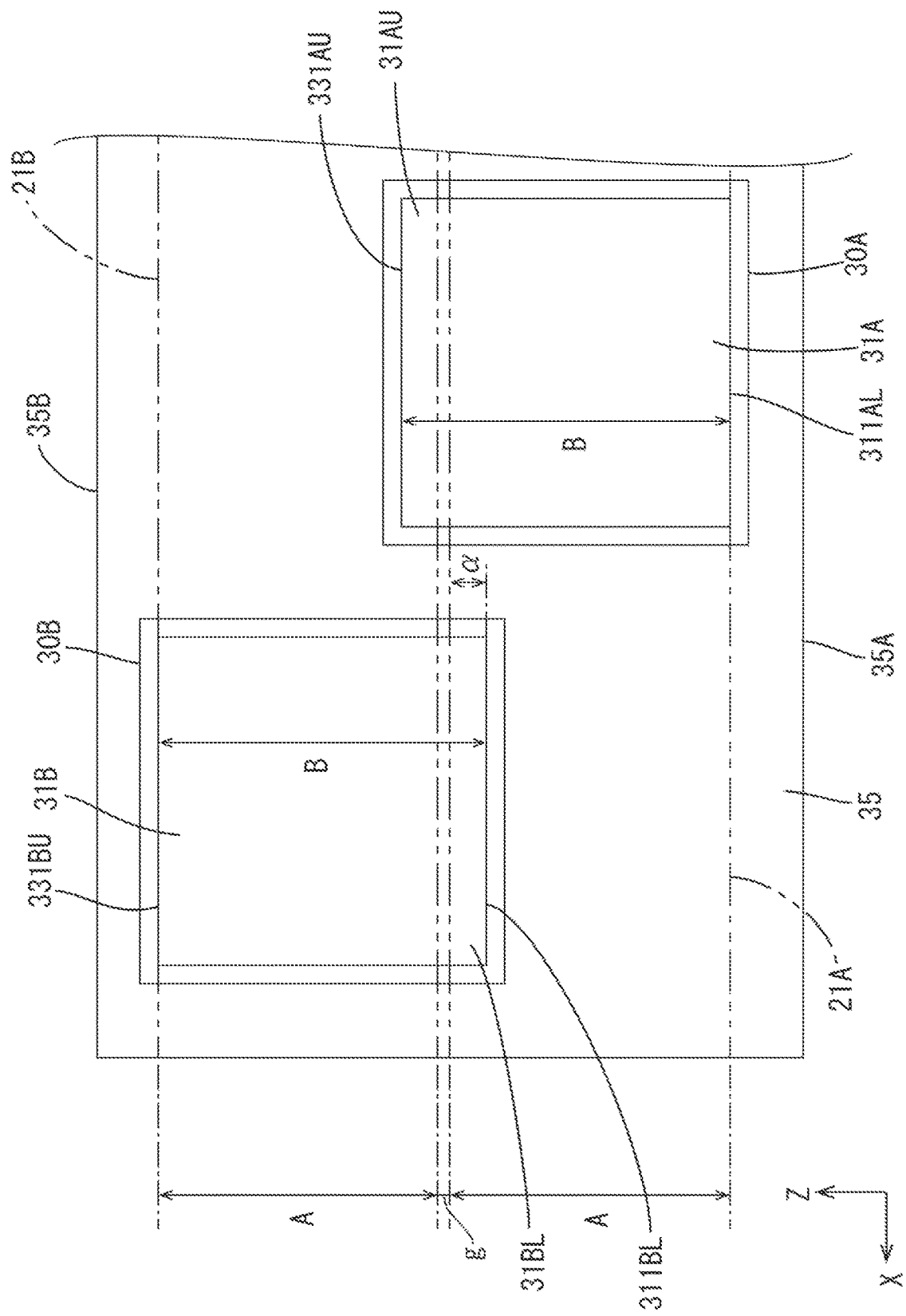
FIG. 4 is an enlarged plan view of a portion of the LED board of FIG. 3.

As illustrated in FIGS. 3 and 4, the first LED row 32A is arranged close to and along a first long-side edge 35A of the LED board 35 and the second LED row 32B is arranged close to and along a second long-side edge 35B of the LED board 35. When the LED board 35 is mounted on the inner surface of the chassis 27, the first LEDs 30A of the first LED row 32A and the second LEDs 30B of the second LED row 32B are arranged alternately at intervals in the long-side direction of the LED board 35, that is, in the extending direction of the light entering edge surface 211. The first LEDs 30A and the second LEDs 30B are arranged in the extending direction of the light entering edge surface 211 in a staggered manner.

The first LEDs 30A and the second LEDs 30B are arranged such that mounting areas of the first LEDs 30A and the second LEDs 30B do not overlap seen from the thickness direction of the light guide plate 21 (the Z-axis direction). On the other hand, the first LEDs 30A and the second LEDs 30B that are adjacent to each other are arranged such that the light emission surfaces 31A and 31B partially overlap seen from the extending direction of the light entering edge surface 211 (the X-axis direction). Specifically, as illustrated in FIGS. 1 and 4, an upper edge portion 31AU of the light emission surface 31A of the first LED 30A and a lower edge portion 31BL of the light emission surface 31B of the second LED 30B overlap each other seen from the X-axis direction.

As illustrated in FIG. 4, an upper edge 311AU (an edge closer to the second long-side edge 35B) of the light emission surface 31A of the first LED 30A is closer to the second long-side edge 35B of the LED board 35 with respect to the short-side direction (the Z-axis direction) of the LED board 35 than a lower edge 311BL (an edge closer to the first long-side edge 35A) of the light emission surface 31B of the second LED 30B is. In other words, the lower edge 311BL (an edge closer to the first long-side edge 35A) of the light emission surface 31B of the second LED 30B is closer to the first long-side edge 35A with respect to the short-side direction of the LED board 35 than the upper edge 311AU of the light emission surface 31A of the first LED 30A is.

As illustrated in FIGS. 1 and 4, a lower edge portion 31BL of the light emission surface 31B of the second LED 30B overlaps the first light guide plate 21A, which is opposite the first LEDs 30A, with respect to a vertical direction to the light entering edge surface 211G (the Y-axis direction). The lower edge portion 31BL and the first light guide plate 21A overlap with an overlapping dimension α that extends in the thickness direction of the light guide plate 21 (the Z-axis direction). The lower edge portions 31BL are opposite an upper portion of the first light entering edge surface 211A of the first light guide plate 21A. Similarly, an upper edge portion 31AU of the light emission surface 31A of the first LED 30A overlaps the second light guide plate 21B, which is opposite the second LEDs 30B, with respect to the vertical direction to the light entering edge surface 211G (the Y-axis direction). The upper edge portions 31AU are opposite a lower portion of the second light entering edge surface 211B of the second light guide plate 21B.

The LEDs 30 are arranged such that the light emission surfaces 31 are within the surface area of the light entering edge surface 211G of the light guide plate group 21G. Specifically, as illustrated in FIG. 4, lower edges 311AL of the light emission surfaces 31A of the first LEDs 30A are located upper than a lower surface of the first light guide plate 21A (the first light exit opposite plate surface 214A) and upper edges 311BU of the light emission surfaces 31B of the second LEDs 30B are located lower than an upper surface (the second light exit plate surface 213B) of the second light guide plate 21B. In the present embodiment, the lower edges 311AL of the light emission surfaces 31A of the first LEDs 30A are flush with the lower surface of the first light guide plate 21A and the upper edges 311BU of the light emission surfaces 31B of the second LEDs 30B are flush with the upper surface of the second light guide plate 21B. According to such a configuration, large LEDs 30 having light emission surfaces of a greater size in the vertical direction (the thickness direction of the light guide plate 21) than the thickness dimension of the light guide plate 21 can be used without changing (increasing) the thickness of the backlight unit 20 (the light guide plate group 21G).

The following relationship is established. In the following relationship, A represents the thickness dimension of the light guide plate 21, B represents the vertical dimension (in the thickness direction of the light guide plate 21) of the light emission surface 31 of the LED 30, and a represents the dimension in the thickness direction of the light guide plate 21 (the Z-axis direction) with which the light emission surface 31 of the LED 30 included in one LED row overlaps the light guide plate 21 that is opposite the LED 30 included in the other LED row (refer to FIG. 4).

$$0<\alpha<B-A$$

The above relationship is established because the two light guide plates having the uneven patterns projecting from the light exit opposite plate surfaces 214 have a slight clearance (g representing the Z-axis dimension of the clearance) therebetween. The vertical dimension B of the light emission surface of the LED 30 is greater than a total of the thickness dimension A of the light guide plate 21 and the clearance dimension g and is not greater than a double dimension of the thickness dimension A of the light guide plate 21 (A+g<B<2A).

Next, distributions of the light exit amounts of light rays with respect to a light travelling direction (the Y-axis direction) in the backlight unit 20 of the present embodiment will be described in detail. In the following description, the value of the dimension g is ignored since the clearance dimension g is too small to be considered compared to the thickness dimension A of the light guide plate 21. In the backlight unit 20 having the above configuration, light rays L1 emitted by the first LEDs 30A enter each of the first light guide plate 21A and the second light guide plate 21B. The amount of light rays entering each of the first light guide plate 21A and the second light guide plate 21B (L1(1) and L1(2)) is as follows.

$$L1=L1(1)+L1(2)$$

$$L1(1)=L1*A/B$$

$$L1(2)=L1*(B-A)/B$$

L1: the amount of light rays emitted by the first LEDs
L1(1): the amount of light rays out of L1 entering the first light guide plate
L1(2): the amount of light rays out of L1 entering the second light guide plate Light rays L2 emitted by the second LEDs 30B enter each of the first light guide plate 21A and the second light guide plate 21B.

$$L2=L2(1)+L2(2)$$

$$L2(1)=L2(B-A)/B$$

$$L2(2)=L2*A/B$$

Figure 5:
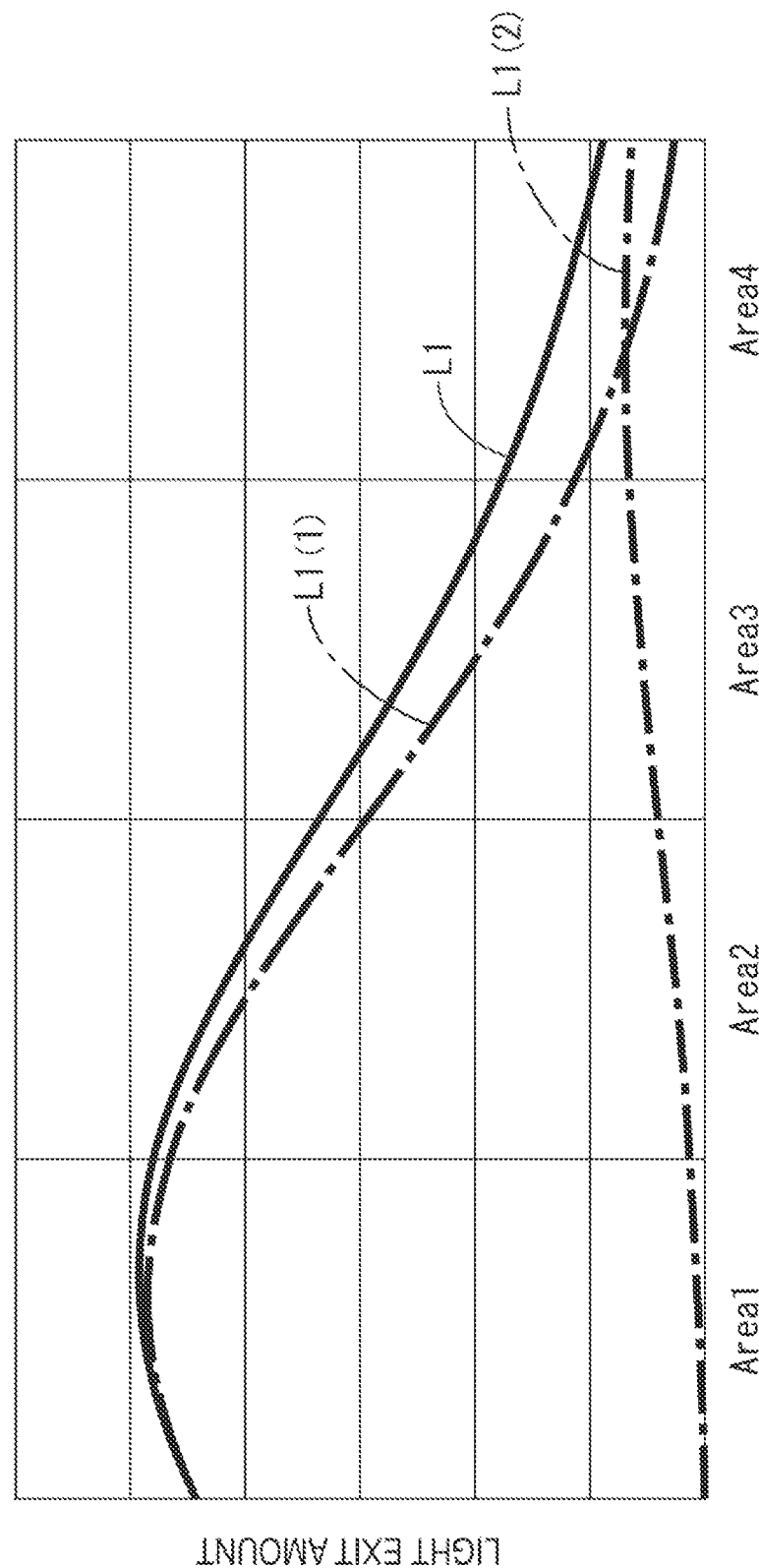
FIG. 5 illustrates graphs representing distributions of light exit amounts of light rays that are emitted by first LEDs and exit each of the light guide plates and the light guide plate group.
Figure 6:
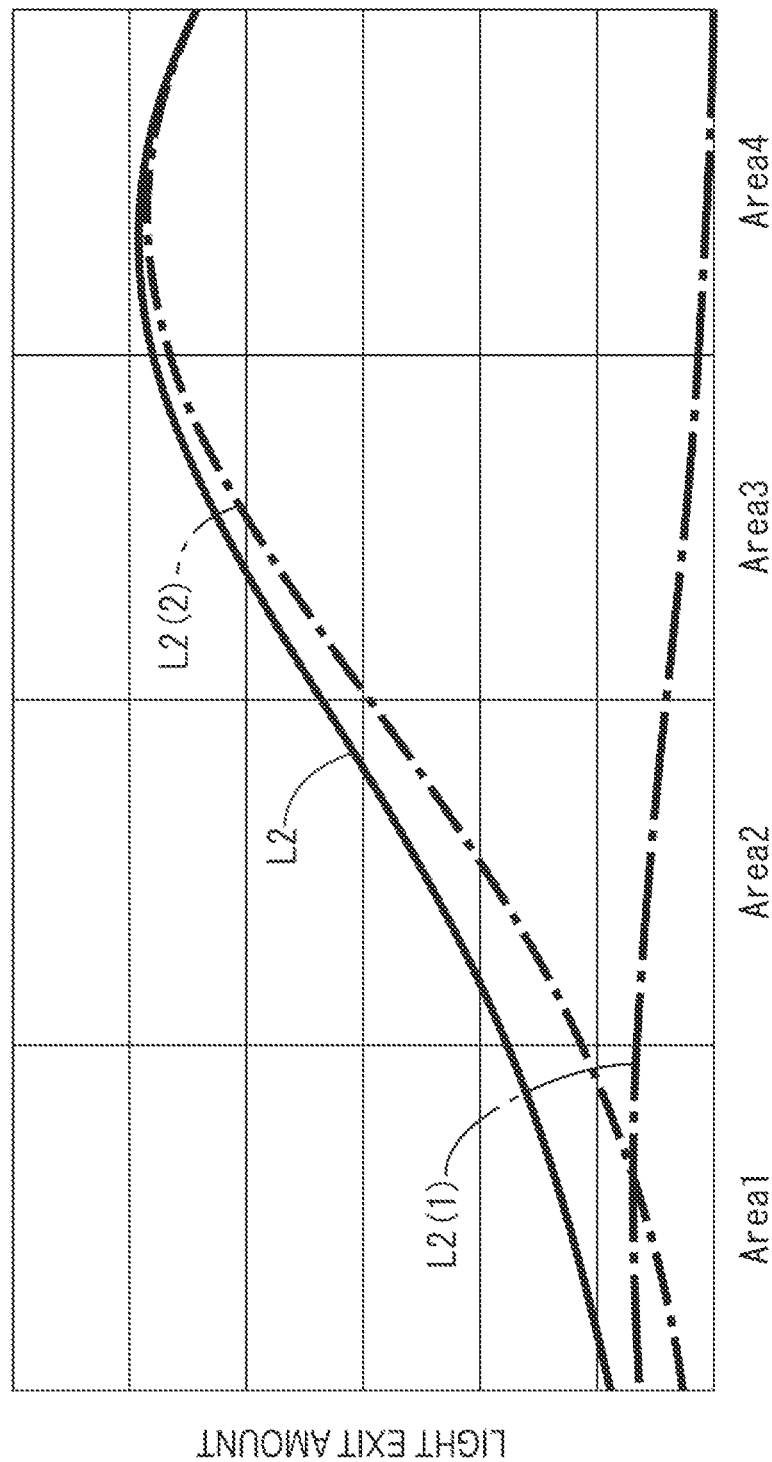
FIG. 6 illustrates graphs representing distributions of light exit amounts of light rays that are emitted by second LEDs and exit each of the light guide plates and the light guide plate group.
Figure 7:
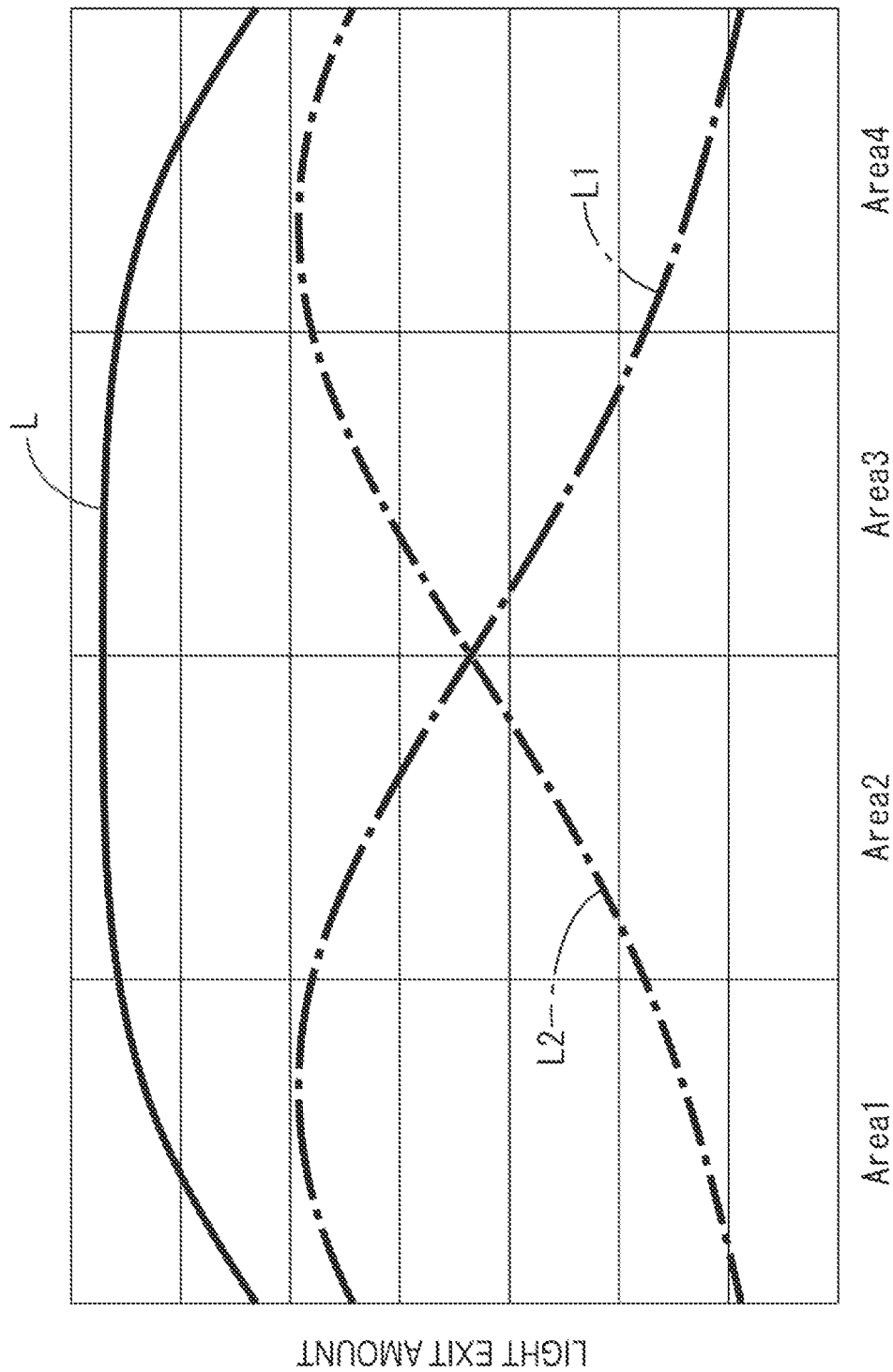
FIG. 7 illustrates graphs representing distributions of light exit amounts of light rays that exit the light guide plate group when the first LEDs and the second LEDs emit light rays at a ratio of 1:1.

L2: the amount of light rays emitted by the second LEDs
L2(1): the amount of light rays out of L2 entering the first light guide plate
L2(2): the amount of light rays out of L2 entering the second light guide plate In the present embodiment, the respective shapes of the light guide plates 21A, 21B for controlling the exiting of light rays (uneven shapes for reflection) are determined such that the light exit amount distributions of the respective light guide plates 21A, 21B are those in FIGS. 5 and 6, respectively, when light rays are emitted only by the first LEDs 30A and when light rays are emitted only by the second LEDs 30B. The light guide plate is divided into four areas in the short-side direction (the Y-axis direction) and the four areas include an area 1, an area 2, an area 3, and an area 4 in this order from the one closest to the LEDs 30. When light rays are emitted by the first LEDs 30A and the second LEDs 30B, the shape of the graph representing the distribution of the light exit amount L of the light guide plate group 21G has a moderate hill form and the graph is lowered at two ends thereof as illustrated in FIG. 7.

The distribution of the light exit amount of the backlight unit 20 (each of the light guide plates 21A, 21B and the light guide plate group 21G) can be controlled freely by changing the light-on ratio R of the LEDs 30A of the first LED row 32A and the LEDs 30B of the second LED row 32B (the ratio of intensity of emission light, 0≤R≤1) and the uneven shape of the light exit opposite plate surfaces 214 for accelerating the light to exit through the light exit plate surfaces 213. The light-on ratio R can be changed by adjusting the light flux amount of light emitted by the LEDs 30A and the LEDs 30B by changing the amount of current to be applied or the duty ratio. The light exit amount distribution of light rays exiting through the light exit plate surface 213 can be controlled by adjusting the uneven shape of the light exit opposite plate surface 214 for accelerating the light to exit through the light exit plate surfaces 213. The desired distribution of the light exit amount can be determined by the combination of the adjusted light-on ratio R and the adjusted uneven shape of the light exit opposite plate surface 214.

In the present embodiment, the first LED 30A and the second LED 30B have a same size and emit light of same brightness. The vertical dimension B of the light emission surface 31 of the first LED 30A and the second LED 30B is 1.15 times as large as the thickness dimension A of the light guide plate 21 (B=1.15A). In other words, light rays L emitted by one of the LEDs 30 enters the light guide plates 21 such that the amount ratio of the light rays entering one of the light guide plate 21 and the other one of the light guide plate 21 is 1:0.15. According to such a configuration, the thickness of the backlight unit 20 can be kept small and brightness of the backlight unit 20 can be improved while using the LEDs 30 including the large light emission surfaces 31 having the dimension 15% larger than the thickness A of the light guide plate 21.

In the present embodiment, as described before, a greatest value of the vertical dimension B of the light emission surface 31 of the LED 30 is less than a doubled value of the thickness dimension A of the light guide plate 21 (A+g<B<2A). The ratio of a bright portion and a dark portion of the light guide plate 21 in the light exit amount distribution becomes smaller as the vertical dimension B of the light emission surface 31 becomes closer to the doubled value of the thickness dimension A of the light guide plate 21. In other words, effects of the local dimming are less likely to be exerted. Therefore, to obtain sufficient local dimming effects, the vertical dimension B of the light emission surface 31 and the thickness dimension A of the light guide plate 21 preferably have a certain difference. In the present embodiment, the vertical dimension B of the light emission surface 31 is preferably less than 1.5 times the thickness dimension A of the light guide plate 21 (A+g<B<1.5A).

According to the present embodiment, the brightness is increased by using the LEDs 30 having the light emission surfaces 31 of a greater size than the thickness dimension A of the light guide plate 21 without changing (increasing) the thickness dimension A of the light guide plate 21.

In the backlight unit applicable to the local dimming technology, halo effect may be caused and the pixel area becomes brighter than brightness that should be. Such halo effect is caused because the number of independent light emission areas of the backlight unit for the display area of the liquid crystal panel is too small to deal with the resolution of the liquid crystal panel and only one dimming light emission area is used to control brightness of multiple pixels. If the multiple pixels in the one dimming light emission area include a bright portion and a dark portion, the dimming light emission is increased to brighten the bright portion and this also supplies light to the dark portion. The liquid crystals do not completely block light and the light leaks through the dark portion and this may cause deviation in hue between the dark portion having light leakage and another dark portion that are included in the same dimming light emission area. The other dark portion has gradation same as that of the dark portion with the light leakage and light is not on. Such a halo effect tends to be seen easily as the difference between the dark portion and the bright portion is quite obvious. The backlight unit that can be controlled with the local dimming controls the dimming light emission area having a small light exit amount to light up to suppress remarkable difference between the dark portion and the bright portion and prevent occurrence of the halo effect.

In the backlight unit 20 of the present embodiment, light emitted by each of the LEDs 30 enters the two light guide plates 21 and the backlight unit 20 has the light exit amount distributions illustrated in FIGS. 5 and 6. Accordingly, the backlight unit 20 includes much less areas having remarkable difference between the dark portion and the bright portion regarding the light emission for each divided area with respect to the vertical direction to the light emission surface 31 of the LED 30 (the Y-axis direction). This causes less occurrence of the halo effect and the backlight unit 20 need not perform control for suppressing the halo effect with respect to the vertical direction to the light emission surface 31 and this reduces control performance of the unit. Furthermore, the LEDs 30 have the light emission surfaces 31 having the vertical dimension B greater than the thickness dimension A of the light guide plate 21 and this improves light use efficiency.

The backlight unit 20 of the present embodiment includes the LEDs 30 having the light emission surfaces 31 through which light emits, and the light guide plates 21 having the light entering edge surfaces 211 that are opposite the light emission surfaces 31 and through which the light from the LEDs 30 enters. Two light guide plates 21 are included in the light guide plate group 21G and overlapped with each other in the thickness direction (the Z-axis direction) of the light guide plates 21 such that the light entering edge surfaces 211 face the same direction. The LEDs 30 are included in the two LED rows 32 (the first LED row 32A and the second LED row 32B) that correspond to the respective light entering edge surfaces 211 of the light guide plates 21. The light emission surface 31 has the dimension B extending in the thickness direction of the light guide plate 21 and the dimension B is greater than the thickness dimension A of the light guide plate 21.

The first LEDs 30A included in the first LED row 32A and the second LEDs 30B included in the second LED row 32B are arranged alternately in a staggered manner in the extending direction of the light entering edge surface 211. The first LEDs 30A and the second LEDs 30B are arranged in the extending direction of the light entering edge surface 211 such that the light emission surfaces 31A and the light emission surfaces 31B do not overlap seen from the thickness direction of the light guide plate 21 (the Z-axis direction) and the light emission surfaces 31A and the light emission surfaces 31B partially overlap seen from the extending direction of the light entering edge surface 211 (the X-axis direction).

According to such a configuration, the LEDs 30 having the light emission surfaces 31 having a dimension larger than the thickness dimension A of the light guide plate 21 can be used without increasing the thickness of the backlight unit 20. Accordingly, the backlight unit 20 and the liquid crystal display device 10 having good design and high brightness can be obtained. Since the backlight unit 20 includes the light guide plates 21, two-dimensional local dimming lighting can be performed within a display surface area. Therefore, the backlight unit 20 can achieve smaller thickness, high brightness, and local dimming at the same time.

The vertical dimension B of the light emission surface 31, which is a dimension extending in the thickness direction of the light guide plate 21, is equal to or less than 1.5 times (is 1.15 times as large as) the thickness dimension A of the light guide plate 21. According to such a configuration, the backlight unit 20 and the liquid crystal display device 10 can increase brightness and have good local dimming effects.

Second Embodiment

Next, a second embodiment will be described with reference to FIGS. 8 to 14. A backlight unit 50 and a liquid crystal display device 40 according to the present embodiment differ from the first embodiment in that a light guide plate group 51G includes three light guide plates 51. Accordingly, the number of LED rows 62 is three. Hereinafter, configurations that are different from those of the first embodiment will be described and configurations of the components same as those of the first embodiment are indicated by the numerals obtained by adding thirty to the numerals of the first embodiment and will not be described.

Figure 8:
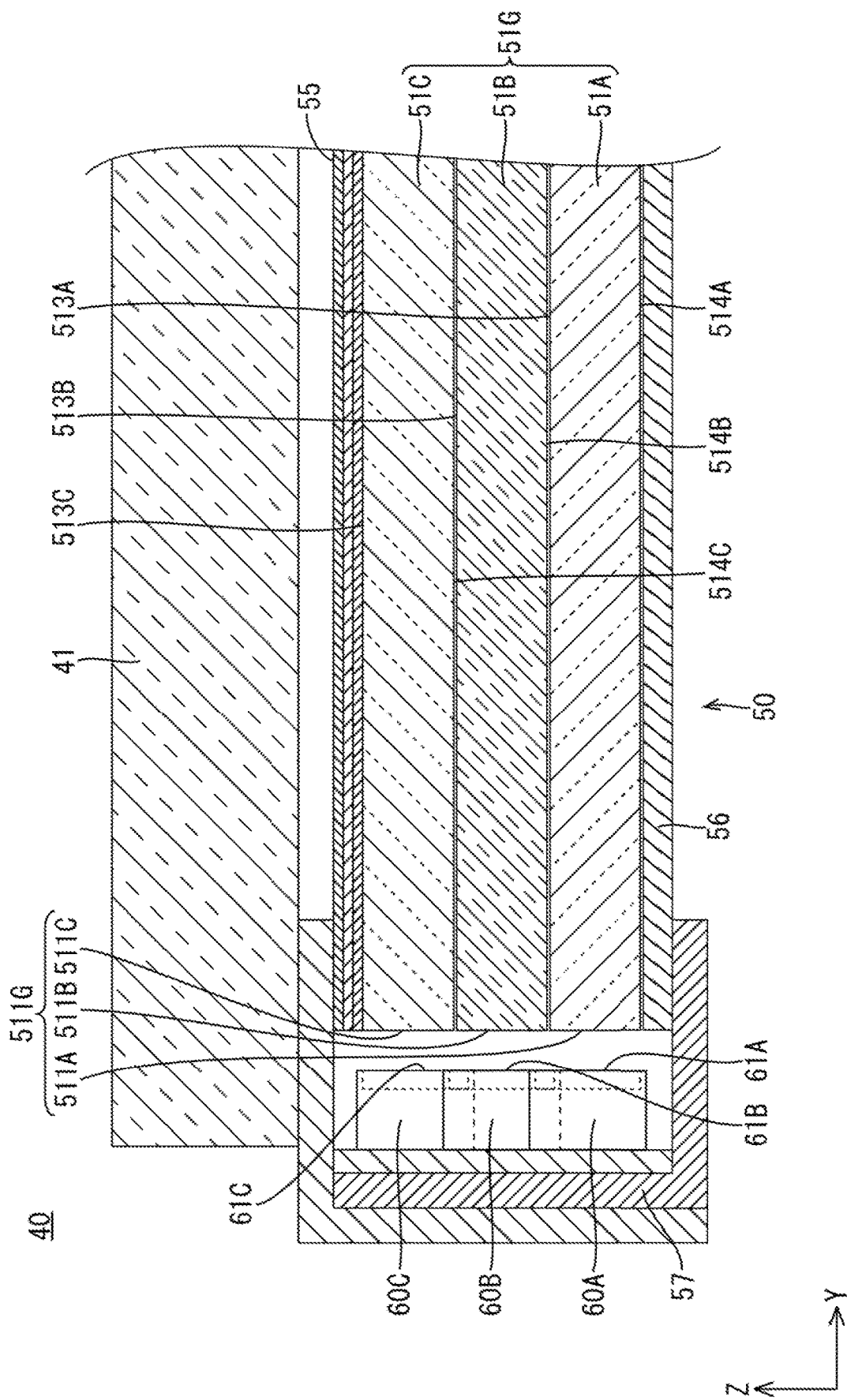
FIG. 8 is an enlarged cross-sectional view of a portion of a liquid crystal display device according to a second embodiment.

As illustrated in FIG. 8, the light guide plate group 51G of the present embodiment includes three light guide plates 51 including a first light guide plate 51A arranged on a relatively back side, a second light guide plate 51B arranged on a front side of the first light guide plate 51A, and a third light guide plate 51C arranged on a front side of the second light guide plate 51B. The first to third light guide plates 51A, 51B, 51C are rectangular plate members having the same shape and the same size and are overlapped with each other over entire areas thereof in a plan view.

The second light guide plate 51B is disposed on the first light guide plate 51A and the third light guide plate 51C is disposed on the second light guide plate 51B in the Z-axis direction. Each of the light guide plates 51 includes outer edge surfaces and an edge surface of the outer edge surfaces that is on a left side in FIG. 8 and extends in the X-axis direction is a light entering edge surface 511 through which light emitted by LED 60 enters. The light entering edge surfaces 511 are vertical to a front-side plate surface of each light guide plate 51 (a light exit plate surface 513, which will be described later) and along an X-Z surface.

Each of the light guide plates 51 includes a front and back plate surfaces. A plate surface facing the front side (a liquid crystal panel 41 side) is a light exit plate surface 513 through which the light exits toward the liquid crystal panel 41 and a plate surface facing the back side is a light exit opposite plate surface 514 that is an opposite surface from the light exit plate surface 513. The first light exit plate surface 513A of the first light guide plate 51A is covered with the second light guide plate 51B over an entire area thereof. The second light exit plate surface 513B of the second light guide plate 51B is covered with the third light guide plate 51C over an entire area thereof. According to such a configuration, the light enters each of the light guide plates 51 through each light entering edge surface 511 and travels within the light guide plate 51. Thereafter, the light is directed in the Z-axis direction and exits through each light exit plate surface 513 toward the front side (the liquid crystal panel 41 side).

Each of the light guide plates 51 includes the grooves (the groove structure) on each light exit plate surface 513 similar to the first embodiment. The grooves extend in the Y-axis direction. The light exit plate surface 513 is divided into four regions by the grooves in the X-axis direction and includes four belt-like divided areas each extending along the Y-axis.

The light exit opposite plate surface 514 has an uneven pattern in a predetermined area. The light that has travelled within the light guide plate 51 exits through the uneven pattern toward an outer side (the light exit plate surface 513 side). In the present embodiment, the first light guide plate 51A has a first uneven pattern in the section of the first light exit opposite plate surface 514A close to the first light entering edge surface 511A. The second light guide plate 51B has a second uneven pattern in a middle section of the second light exit opposite plate surface 514B. The third light guide plate 51C has a third uneven pattern in the section of the third light exit opposite plate surface 514C far from the third light entering edge surface 511C. With such a configuration, the light guide plates 51A, 51B, 51C have different brightness distributions and the light guide plate group 51G includes divided areas defined by the combination of the grooves and the uneven pattern and can be controlled to light up each of the divided area separately and exerts a function of local dimming.

As illustrated in FIG. 8, the light guide plate group 51G having the above configuration is arranged directly below the liquid crystal panel 41 while having optical sheets 55 therebetween. A reflection sheet 56 is disposed on the back-surface side (the light exit opposite plate surface 514A side) of the first light guide plate 51A.

Figure 9:
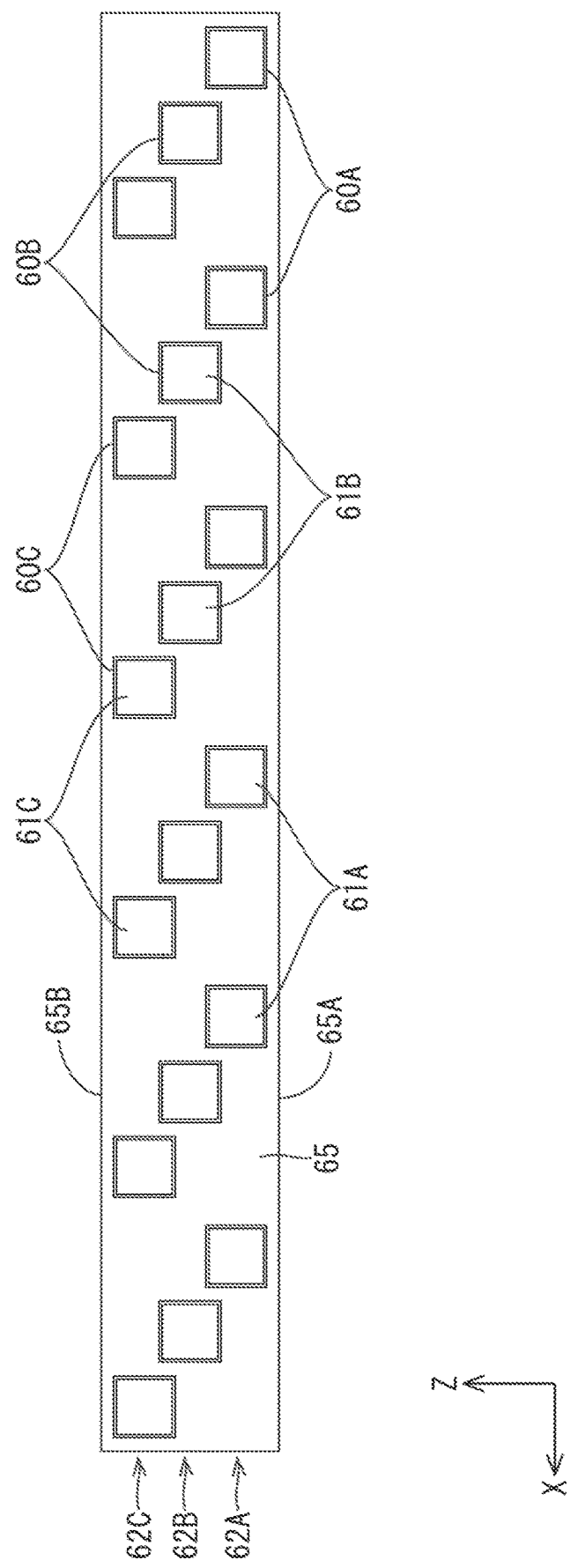
FIG. 9 is a plan view of an LED board.

As illustrated in FIG. 9, the LEDs 60 that are arranged in three rows along the long-side direction of an LED board 65, which is formed in a belt shape. Three of the LEDs 60 included in the respective three rows (a set of the LEDs 60) are displaced from each other in the thickness direction and do not overlap seen from a thickness direction of the LED board 65. Multiple sets of three LEDs 60 are arranged repeatedly in the long-side direction of the LED board 65, or in the extending direction of the light entering edge surface 511 of the light guide plate 51 when the LED board 65 is mounted in a chassis 57. The LEDs 60 include first LEDs 60A included in a first LED row 62A, second LEDs 60B included in a second LED row 62B, and third LEDs 60C included in a third LED row 62C. The first LED row 62A extends near a first long-side edge 65A of the LED board 65 and the third LED row 62C extends near a second long-side edge 65B of the LED board 65 and the second LED row 62B is between the first LED row 62A and the third LED row 62C.

The first LEDs 60A included in the first LED row 62A, the second LEDs 60B included in the second LED row 62B, and the third LEDs 60C included in the third LED row 62C are arranged at intervals in the long-side direction of the LED board 65 or in the extending direction of the light entering edge surface 511 (the X-axis direction) in a staggered manner. The first LEDs 60A, the second LEDs 60B, and the third LEDs 60C are arranged such that mounting areas thereof do not overlap seen from the short-side direction of the LED board 65 or the thickness direction of the light guide plate 51 (the Z-axis direction). On the other hand, the first LEDs 60A and the second LEDs 60B that are adjacent to each other are arranged such that the light emission surfaces 61A and 61B partially overlap seen from the long-side direction of the LED board 65 or the extending direction of the light entering edge surface 511 (the X-axis direction), and the second LEDs 60B and the third LEDs 60C that are adjacent to each other are arranged such that the light emission surfaces 61B and 61C partially overlap seen from the long-side direction of the LED board 65 or the extending direction of the light entering edge surface 511.

Figure 10:
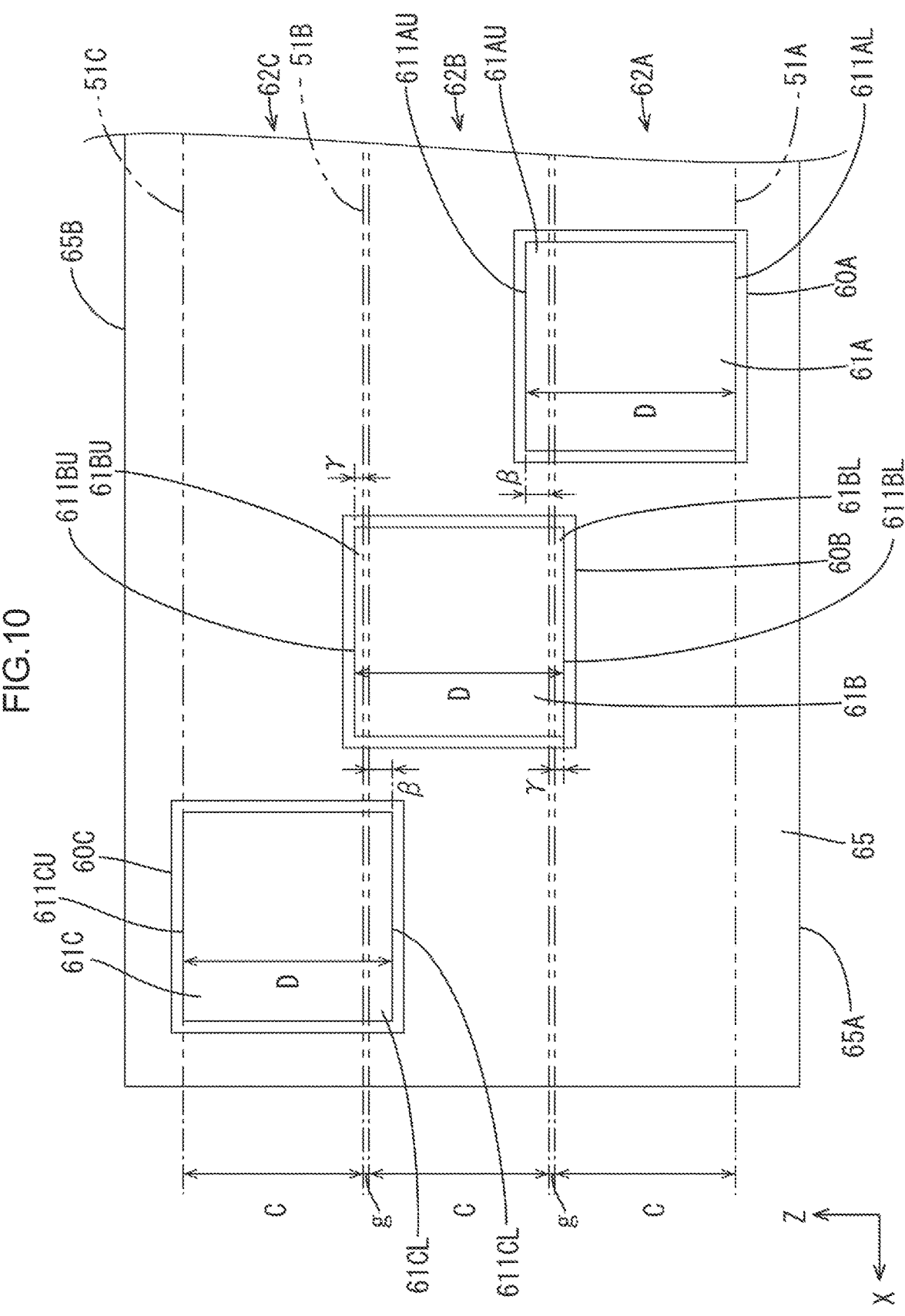
FIG. 10 an enlarged plan view of a portion of the LED board of FIG. 9.

Specifically, as illustrated in FIGS. 8 and 10, an upper edge portion 61AU of the light emission surface 61A of the first LED 60A and a lower edge portion 61BL of the light emission surface 61B of the second LED 60B overlap each other seen from the X-axis direction, and an upper edge portion 61BU of the light emission surface 61B of the second LED 60B and a lower edge portion 61CL of the light emission surface 61C of the third LED 60C overlap each other seen from the X-axis direction.

As illustrated in FIG. 10, an upper edge 611AU (an edge closer to the second long-side edge 65B) of the light emission surface 61A of the first LED 60A is closer to the second long-side edge 65B of the LED board 65 with respect to the short-side direction of the LED board 65 (the Z-axis direction) than a lower edge 611BL (an edge closer to the first long-side edge 65A) of a light emission surface 611B of the second LED 60B is. In other words, the lower edge 611BL (the edge closer to the first long-side edge 65A) of the light emission surface 611B of the second LED 60B is closer to the first long-side edge 65A with respect to the short-side direction of the LED board 65 than the upper edge 611AU (the edge closer to the second long-side edge 65B) of the light emission surface 61A of the first LED 60A is. The position relationship between an upper edge 611BU of the light emission surface 61B of the second LED 60B and a lower edge 611CL of the light emission surface 61C of the third LED 60C is similar to the above one.

As illustrated in FIGS. 8 and 10, an upper edge portion 61AU of the light emission surface 61A of the first LED 60A overlaps the second light guide plate 51B, which is opposite the second LEDs 60B, with respect to a vertical direction to the light entering edge surface 511G (the Y-axis direction). The upper edge portion 61AU and the second light guide plate 51B overlap with an overlapping dimension β that extends in the thickness direction of the light guide plate 51 (the Z-axis direction). The upper edge portions 61AU are opposite the lower portion of the second light entering edge surface 511B of the second light guide plate 51B. Similarly, a lower edge portion 61CL of the light emission surface 61C of the third LED 60C overlaps the second light guide plate 51B, which is opposite the second LEDs 60B, with respect to the vertical direction to the light entering edge surface 511G (the Y-axis direction). The lower edge portion 61CL and the second light guide plate 51B overlap with the overlapping dimension β. The lower edge portions 61CL are opposite the upper portion of the second light entering edge surface 511B of the second light guide plate 51B.

An upper edge portion 61BU of the light emission surface 61B of the second LED 60B overlaps the third light guide plate 51C, which is opposite the third LEDs 60C, with respect to the vertical direction to the light entering edge surface 511G (the Y-axis direction). The upper edge portion 61BU and the third light guide plate 51C overlap with an overlapping dimension γ that extends in the thickness direction of the light guide plate 51 (the Z-axis direction). The upper edge portions 61BU are opposite the lower portion of the third light entering edge surface 511C of the third light guide plate 51C. Similarly, a lower edge portion 61BL of the light emission surface 61B of the second LED 60B overlaps the first light guide plate 51A, which is opposite the first LEDs 60A, with respect to the vertical direction to the light entering edge surface 511G (the Y-axis direction). The lower edge portion 61BL and the first light guide plate 51A overlap with the overlapping dimension γ. The lower edge portions 61BL are opposite the upper portion of the first light entering edge surface 511A of the first light guide plate 51A.

The LEDs 60 are arranged such that the light emission surfaces 61A of the first LEDs 60A and the light emission surfaces 61C of the third LEDs 60C are within the surface area of the light entering edge surface 511G of the light guide plate group 51G. Specifically, lower edges 611AL of the light emission surfaces 61A of the first LEDs 60A are located upper than a lower surface of the first light guide plate 51A and upper edges 611CU of the light emission surfaces 61C of the third LEDs 60C are located lower than an upper surface of the third light guide plate 51C. In the present embodiment, the lower edges 611AL of the light emission surfaces 61A of the first LEDs 60A are flush with the lower surface of the first light guide plate 51A and the upper edges 611CU of the light emission surfaces 61C of the third LEDs 60C are flush with the upper surface of the third light guide plate 51C. According to such a configuration, large LEDs 60 having light emission surfaces of a greater size in the vertical direction (the thickness direction of the light guide plate 51) than the thickness dimension of the light guide plate 51 can be used without changing (increasing) the thickness of the backlight unit 50 (the light guide plate group 51G).

The following relationship is established. In the following relationship, C represents the thickness dimension of the light guide plate 51, D represents the vertical dimension (in the thickness direction of the light guide plate 51) of the light emission surface 61 of the LED 60, and β represents a dimension in the thickness direction of the light guide plate 51 (the Z-axis direction) with which the second light guide plate 51B overlaps each of the light emission surface 61A of the first LED 60A included in the first LED row 62A and the light emission surface 61C of the third LED 60C included in the third LED row 62C.

$$0 < \beta < D - C$$

The following relationship is established, and γ represents a dimension in the thickness direction of the light guide plate 51 with which the light emission surface 61B of the LED 60B included in the second LED row 62B overlaps each of the first light guide plate 51A and the third light guide plate 51C.

$$0 < \gamma < (D - C)/2$$

The second LEDs 60B are arranged such that a center of each light emission surface 61B with respect to the vertical direction matches a center of the second light guide plate 51B with respect to the thickness direction. Similar to the above embodiment, the light guide plates 51 are configured to have the uneven patterns projecting from the light exit opposite plate surfaces 514 and the clearance g is provided between adjacent two light guide plates 51. The vertical dimension D of the light emission surface 61 of the LED 60 is greater than a total of the thickness dimension C of the light guide plate 51 and a doubled value of the clearance dimension g and is not greater than a doubled value of the thickness dimension C of the light guide plate 51 ($C + 2g < D < 2C$).

Next, distributions of the light exit amounts with respect to a light travelling direction (the Y-axis direction) in the backlight unit 50 of the present embodiment will be described in detail. In the following description, the value of the dimension g is ignored since the clearance dimension g is too small to be considered compared to the thickness dimension C of the light guide plate 51. In the backlight unit 50 having the above configuration, light rays L1 emitted by the first LEDs 60A enter each of the first light guide plate 51A and the second light guide plate 51B. The amount of light rays entering each of the light guide plate 51A and the second light guide plate 51B (L1(1) and L1(2)) is as follows.

$$L1 = L1(1) + L1(2) + L1(3)$$

$$L1(1) = L1 * C/D$$

$$L1(2) = L1 * (D - C)/D$$

$$L1(3) = 0$$

L1: the amount of light rays emitted by the first LEDs
L1(1): the amount of light rays out of L1 entering the first light guide plate
L1(2): the amount of light rays out of L1 entering the second light guide plate
L1(3): the amount of light rays out of L1 entering the third light guide plate Light rays L2 emitted by the second LEDs 60B enter each of the first light guide plate 51A, the second light guide plate 51B, and the third light guide plate 51C.

$$L2=L2(1)+L2(2)+L2(3)$$

$$L2(1)=L2*(D-C)/2D$$

$$L2(2)=L2*C/D$$

$$L2(3)=L2*(D-C)/2D$$

L2: the amount of light rays emitted by the second LEDs
L2(1): the amount of light rays out of L2 entering the first light guide plate
L2(2): the amount of light rays out of L2 entering the second light guide plate
L2(3): the amount of light rays out of L2 entering the third light guide plate Further, light rays L3 emitted by the third LEDs 60C enter each of the second light guide plate 51B and the third light guide plate 51C.

$$L3=L3(1)+L3(2)+L3(3)$$

$$L3(1)=0$$

$$L3(2)=L3*(D-C)/D$$

$$L3(3)=L3*C/D$$

Figure 11:
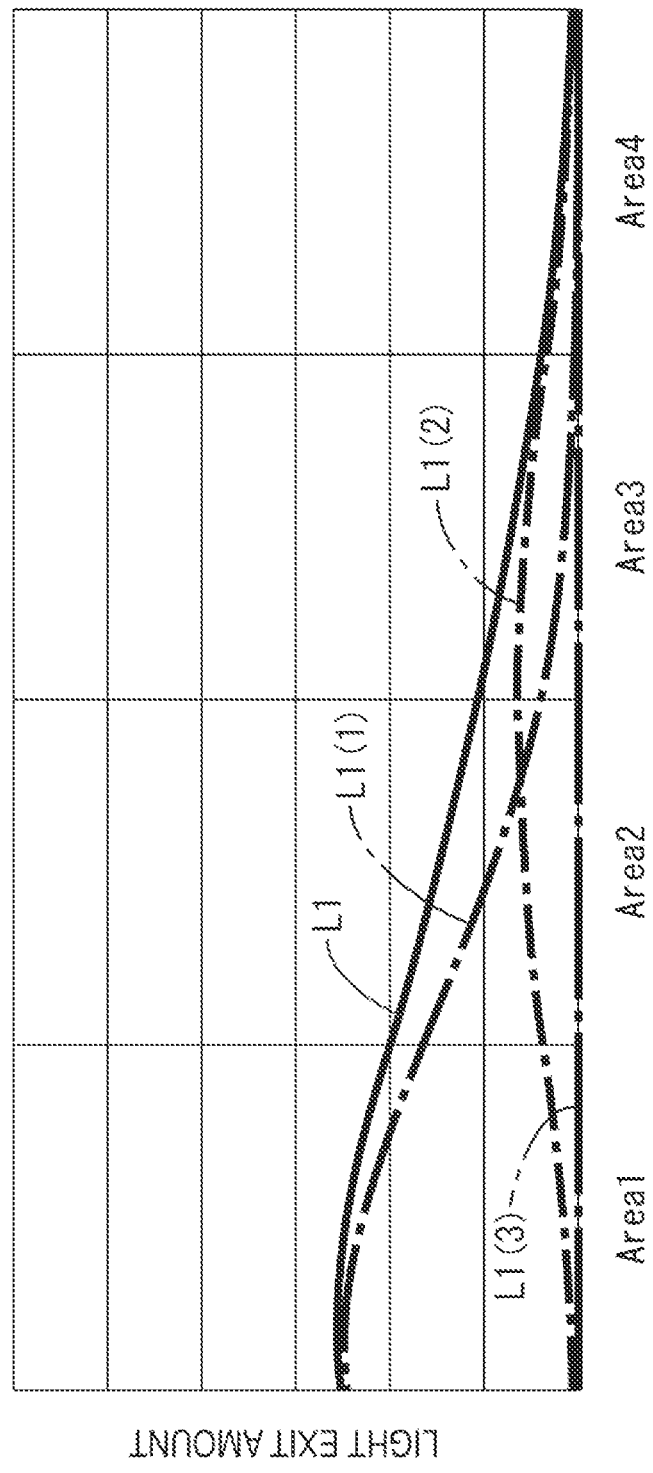
FIG. 11 illustrates graphs representing distributions of light exit amounts of light rays that are emitted by first LEDs and exit each of the light guide plates and the light guide plate group.
Figure 12:
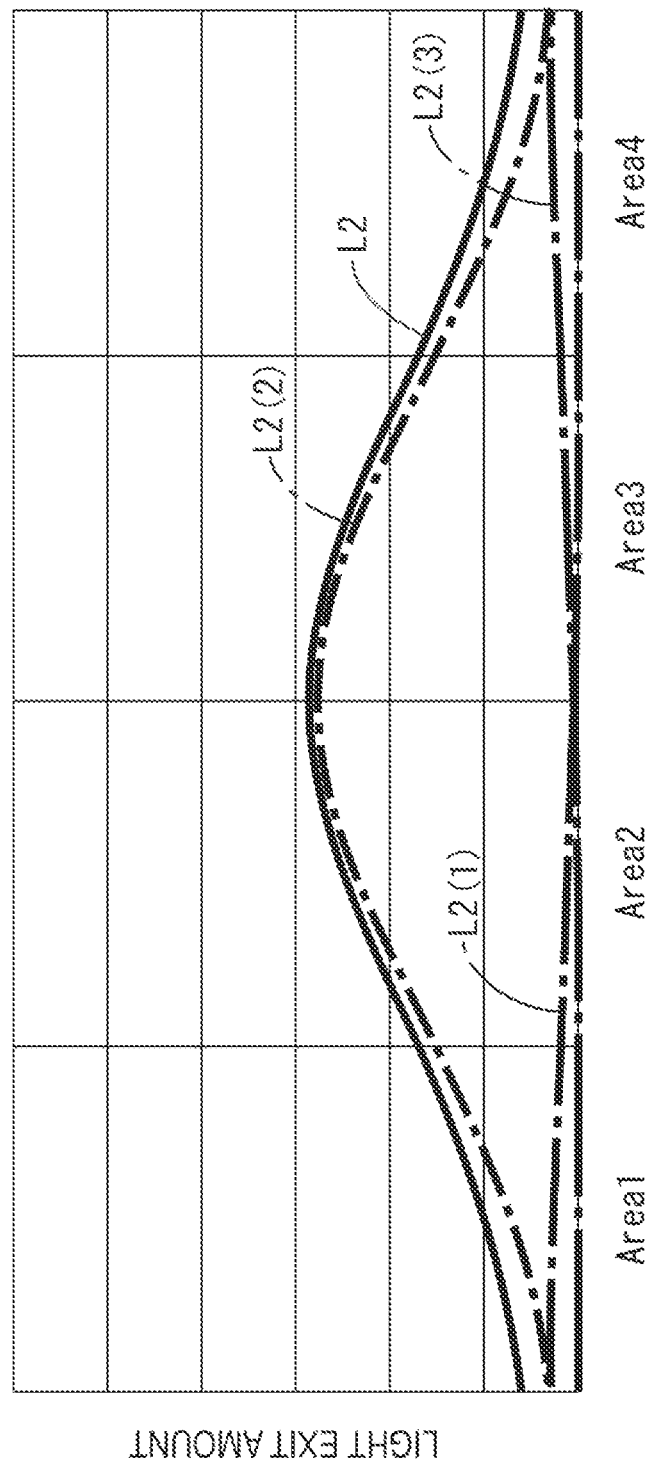
FIG. 12 illustrates graphs representing distributions of light exit amounts of light rays that are emitted by second LEDs and exit each of the light guide plates and the light guide plate group.
Figure 13:
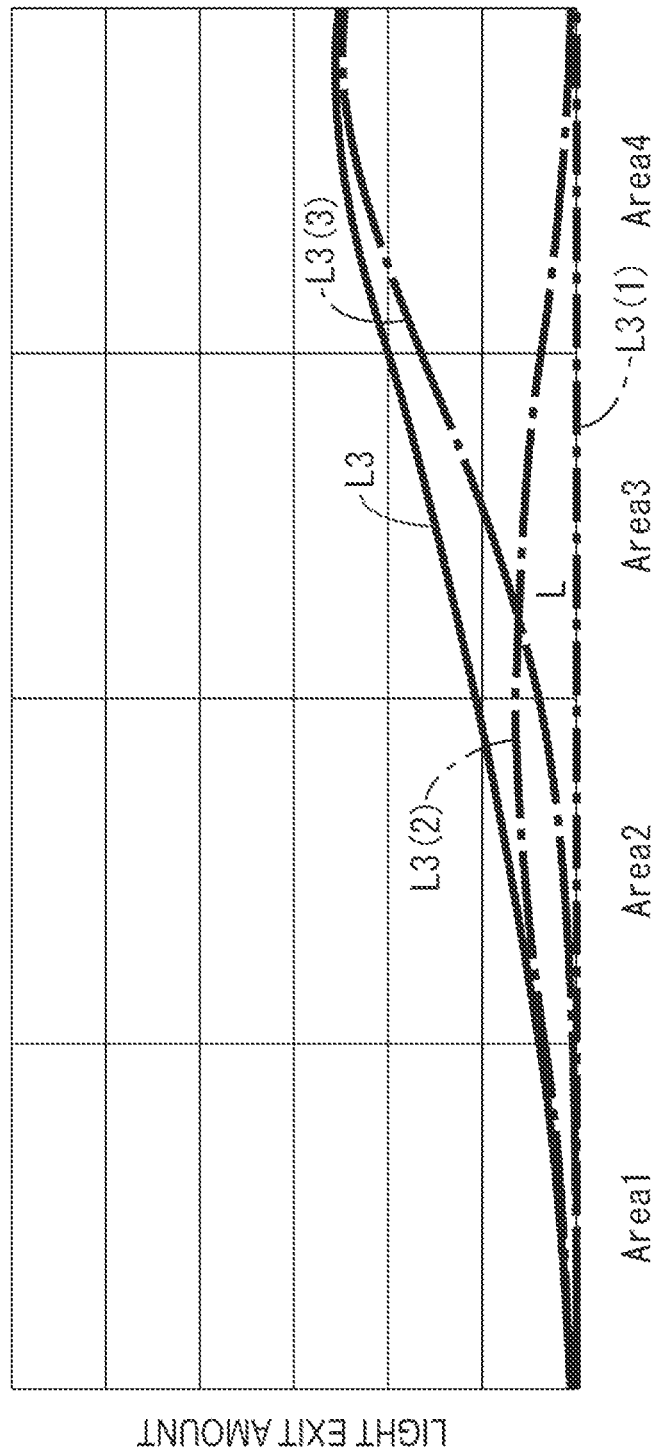
FIG. 13 illustrates graphs representing distributions of light exit amounts of light rays that are emitted by third LEDs and exit each of the light guide plates and the light guide plate group.
Figure 14:
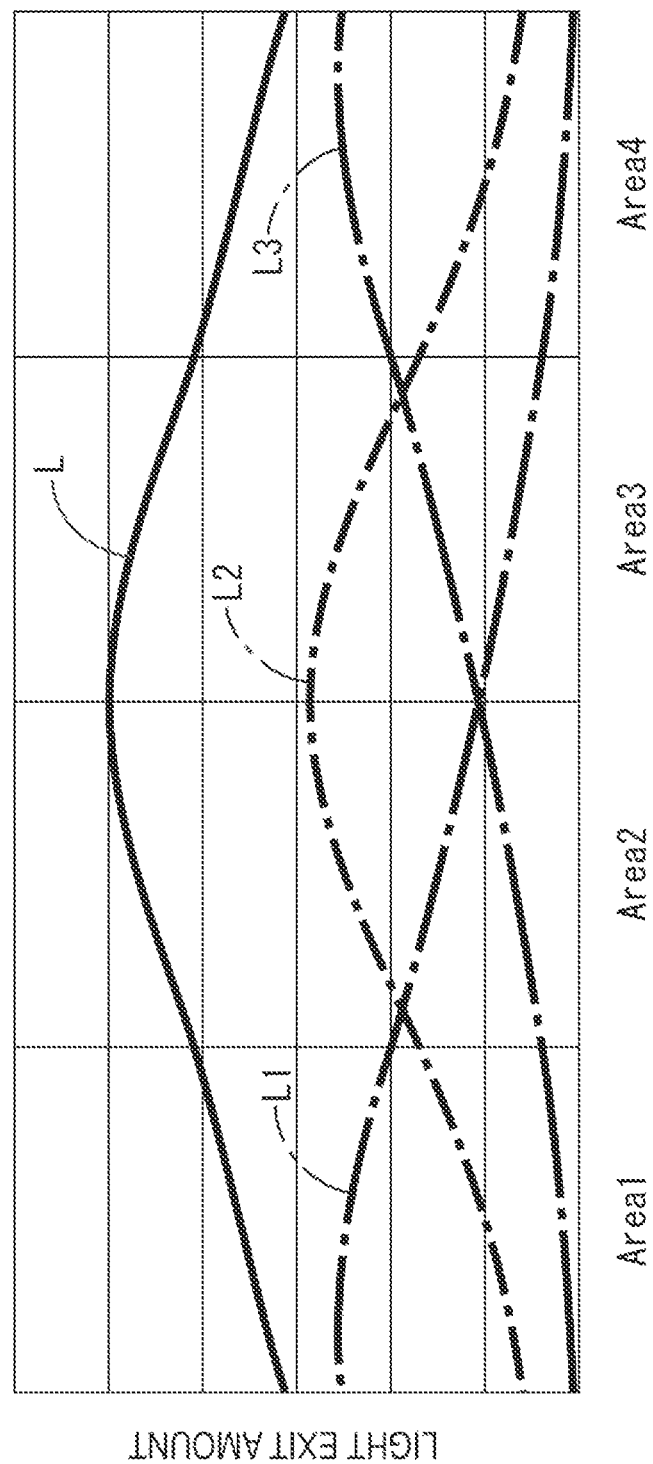
FIG. 14 illustrates graphs representing distributions of light exit amounts of light rays that exit the light guide plate group when the first LEDs, the second LEDs, and third LEDs emit light rays at a ratio of 1:1:1.

L3: the amount of light rays emitted by the third LEDs
L3(1): the amount of light rays out of L3 entering the first light guide plate
L3(2): the amount of light rays out of L3 entering the second light guide plate
L3(3): the amount of light rays out of L3 entering the third light guide plate In the present embodiment, the respective shapes of the light guide plates 51A, 51B, 51C related to the exiting of light rays (uneven shapes for reflection) are determined such that the light exit amount distributions of the respective light guide plates 51A, 51B, 51C are those in FIGS. 11, 12, and 13, respectively, when light rays are emitted only by the first LEDs 60A, when light rays are emitted only by the second LEDs 60B, and when light rays are emitted only by the second LEDs 60C, respectively. When light rays are emitted by the first LEDs 60A, the second LEDs 60B, and the third LEDs 60C, the shape of the graph representing the distribution of the light exit amount L of the light guide plate group 51G has a moderate hill form as illustrated in FIG. 14.

In the present embodiment, similar to the first embodiment, the distribution of the light exit amount of the backlight unit 50 (each of the light guide plates 51A, 51B, 51C and the light guide plate group 51G) can be controlled freely by changing the respective light-on ratios R of the LEDs 60 included in the respective LED rows 62 (the ratio of intensity of emission light, 0≤R≤1) separately.

The backlight unit 50 of the present embodiment includes the LEDs 60 having the light emission surfaces 61 through which light emits, and the light guide plates 51 having the light entering edge surfaces 511 that are opposite the light emission surfaces 61 and through which the light from the LEDs 60 enters. Three light guide plates 51 are included in the light guide plate group 51G and overlapped with each other in the thickness direction (the Z-axis direction) of the light guide plates 51 such that the light entering edge surfaces 511 face the same direction. The LEDs 60 are included in the three LED rows 62 (the first LED row 62A, the second LED row 62B, and the third LED row 62C) that correspond to the respective light entering edge surfaces 511 of the light guide plates 51. The light emission surface 61 has the dimension D extending in the thickness direction of the light guide plate 51 and the dimension D is greater than the thickness dimension C of the light guide plate 51. The first LEDs 60A included in the first LED row 62A, the second LEDs 60B included in the second LED row 62B, and the third LEDs 60C included in the third LED row 62C are arranged alternately in a staggered manner in the extending direction of the light entering edge surface 511. The LEDs 60 are arranged such that the light emission surfaces 61 do not overlap seen from the thickness direction of the light guide plate 51 and the light emission surfaces 61 partially overlap seen from the extending direction of the light entering edge surface 511.

According to such a configuration, the LEDs 60 having the light emission surfaces 61 having a dimension larger than the thickness dimension C of the light guide plate 51 can be used without increasing the thickness of the backlight unit 50. Therefore, the backlight unit 50 can achieve smaller thickness, high brightness, and local dimming at the same time.

Third Embodiment

Next, a third embodiment will be described with reference to FIGS. 15 and 16. A backlight unit and a liquid crystal display device according to the present embodiment differ from the second embodiment in a configuration of second LEDs 160B. The second LED 160B includes a light emission surface 161B that has a size different from that of the first LED 60A and the third LED 60C and has a vertical dimension C substantially same as the thickness dimension C of the light guide plate 51. Other configurations are similar to those of the second embodiment and indicated by the same numerals as those in the second embodiment and will not be described.

The first LEDs 60A and the second LEDs 160B included in the first LED row 62A and a second LED row 162B that are adjacent to each other are arranged such that the light emission surfaces 61A and 161B are partially overlapped seen from the long-side direction of a LED board 65 (the X-axis direction). The second LEDs 160B and the third LEDs 60C included in the second LED row 162B and the third LED row 62C that are adjacent to each other are arranged such that the light emission surfaces 161B and 61C are partially overlapped seen from the long-side direction of the LED board 65. The light emission surfaces 61A and 61C of the first LEDs 60A and the third LEDs 60C have the vertical dimension D that is greater than the vertical dimension C of the light guide plate 51. The light emission surfaces 161B of the second LEDs 160B have a vertical dimension that is substantially equal to the vertical dimension C of the light guide plate 51 and smaller than the vertical dimension D of the first LEDs 60A and the third LEDs 60C.

Figure 15:
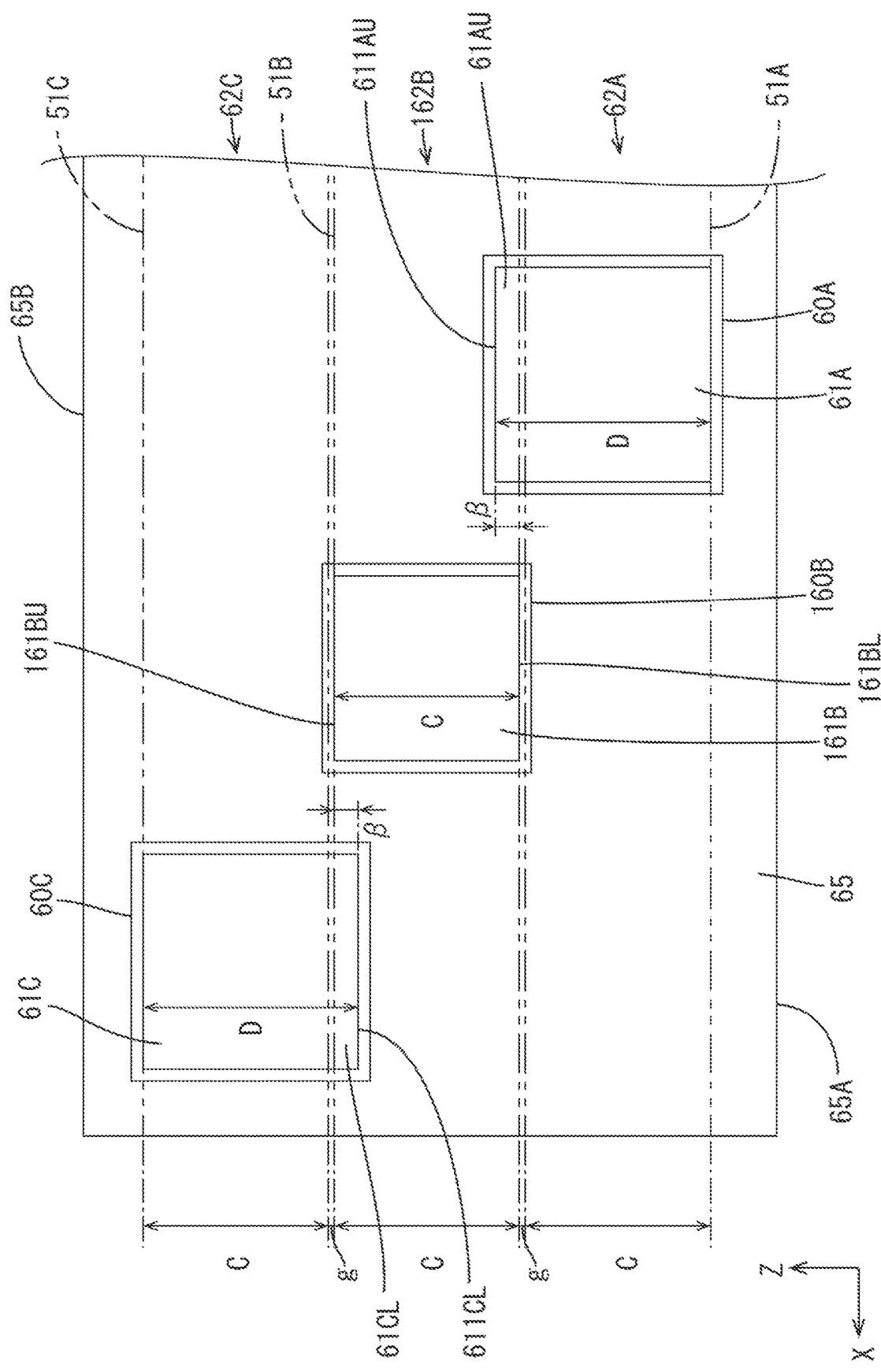
FIG. 15 is an enlarged plan view of a portion of an LED board according to a third embodiment.
Figure 16:
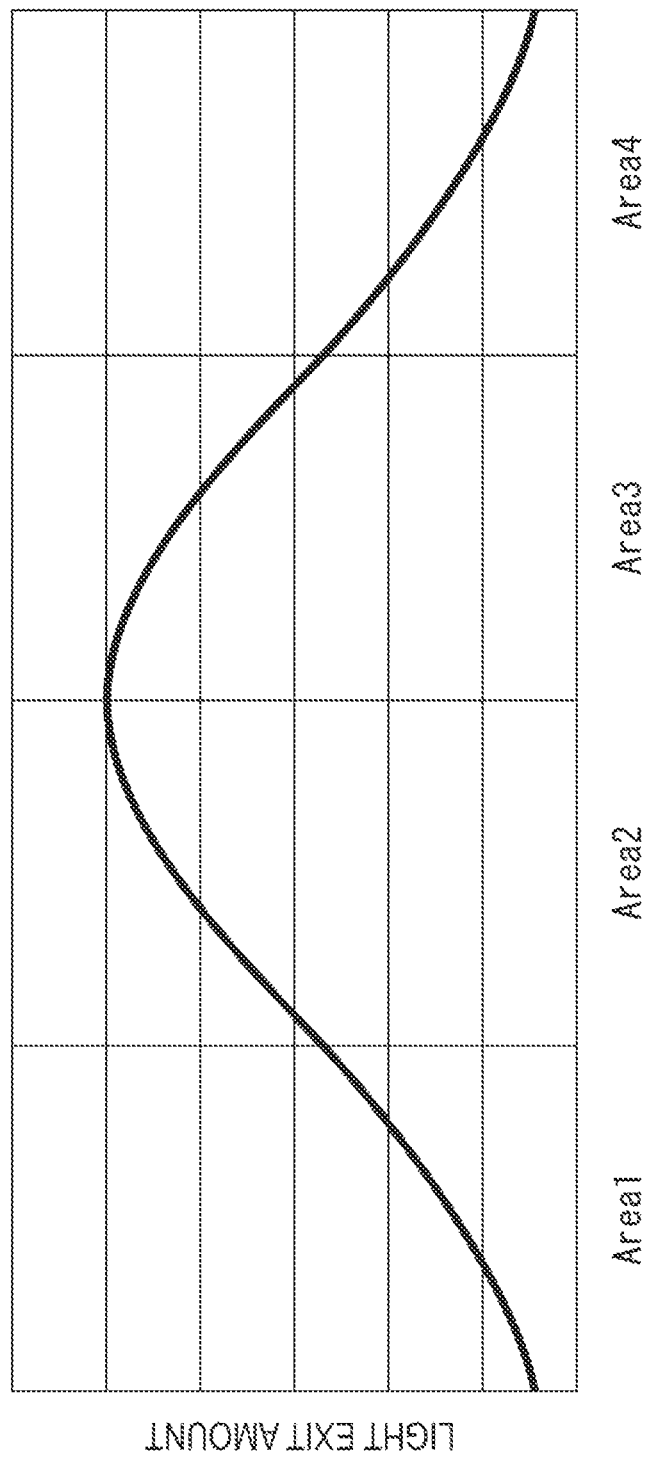
FIG. 16 illustrates a graph representing a distribution of light exit amounts of light rays that exit the light guide plate group when the first LEDs, the second LEDs, and the third LEDs emit light rays at a ratio of 1:1:1.

As illustrated in FIG. 15, the upper edge 611AU of the light emission surface 61A of the first LED 60A is closer to the second long-side edge 65B than a lower edge 161BL of the light emission surface 161B of the second LED 160B. The lower edge 611CL of the light emission surface 61C of the third LED 60C is closer to the first long-side edge 65A than an upper edge 161BU of the light emission surface 161B of the second LED 160B.

As illustrated in FIG. 15, the upper edge portion 61AU of the light emission surface 61A of the first LED 60A overlaps the second light guide plate 51B, which is opposite the second LEDs 160B, with respect to the vertical direction to the light entering edge surface 511G (the Y-axis direction). The upper edge portion 61AU and the second light guide plate 51B overlap with the overlapping dimension β that extends in the thickness direction of the light guide plate 51 (the Z-axis direction). The upper edge portions 61AU are opposite the upper portion of the second light entering edge surface 511B of the second light guide plate 51B. Similarly, the lower edge portion 61CL of the light emission surface 61C of the third LED 60C overlaps the second light guide plate 51B, which is opposite the second LEDs 160B, with respect to the vertical direction to the light entering edge surface 511G (the Y-axis direction). The lower edge portion 61CL and the second light guide plate 51B overlap with the overlapping dimension β. The lower edge portions 61CL are opposite the upper portion of the second light entering edge surface 511B of the second light guide plate 51B.

In the present embodiment, upper edges 161BU of the light emission surfaces 161B of the second LEDs 160B are flush with the upper surface of the second light guide plate 51B and lower edges 161BL of the light emission surfaces 161B of the second LEDs 160B are flush with the lower surface of the second light guide plate 51B. The light emission surfaces 161B of the second LEDs 160B do not overlap the first light guide plate 51A and the third light guide plate 51A with respect to the vertical direction to the light entering edge surface 511G (the Y-axis direction). According to such a configuration, light that is emitted by the second LEDs 160B toward the light guide plate group 51G does not enter the first light guide plate 51A and the third light guide plate 51C and enters only the second light guide plate 51B.

The light guide plate group 51G includes the three light guide plates 51 that are disposed top on each other and includes the second light guide plate 51B in a middle. The light emission surfaces 161B of the second LEDs 160B that emit light toward the second light guide plate 51B have a vertical dimension extending in the thickness direction of the light guide plate 51 and the vertical dimension of the light emission surfaces 161B is equal to the thickness dimension C of the light guide plate 51. According to such a configuration, in the distribution of the light exit amount of the backlight unit illustrated in FIG. 16, a section close to the LEDs 60A, 160B, 60C and a section far away from the LEDs 60A, 160B, 60C with respect to the Y-axis direction have low brightness. Therefore, a higher contrast ratio is obtained when an image including a bright portion only in a middle section is displayed.

Fourth Embodiment

Figure 17:
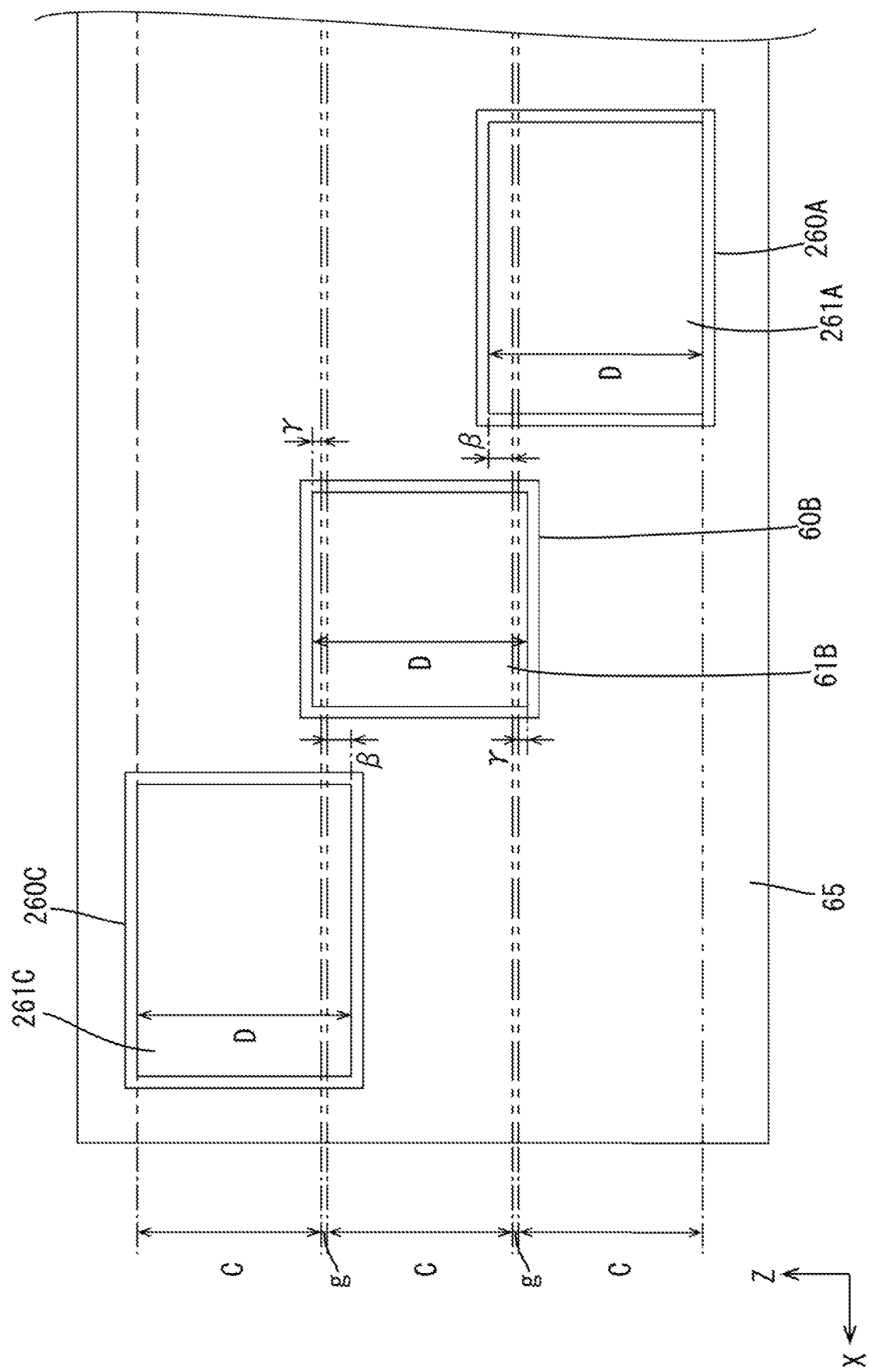
FIG. 17 is an enlarged plan view of a portion of an LED board according to a fourth embodiment.
Figure 18:
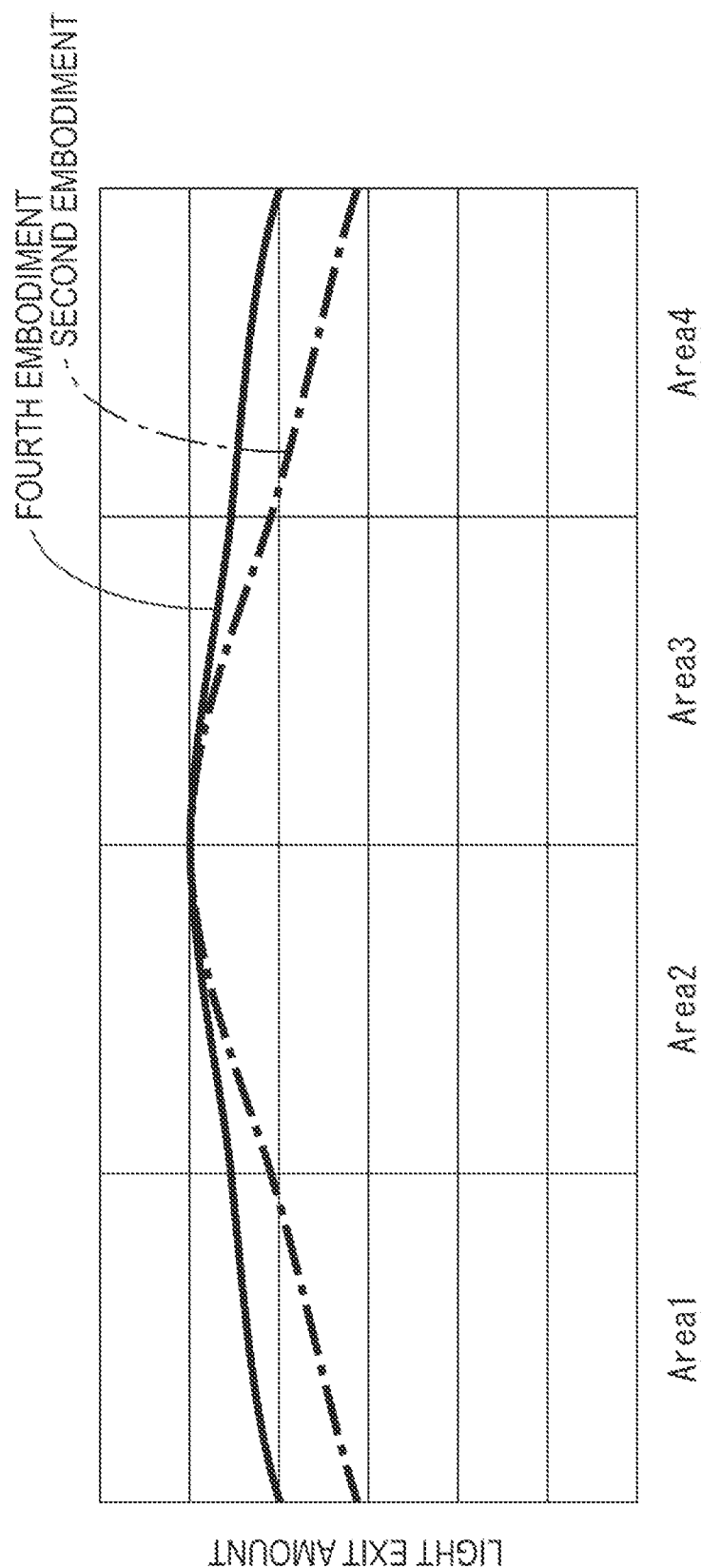
FIG. 18 illustrates graphs representing distributions of light exit amounts of light rays that exit the light guide plate group when the first LEDs, the second LEDs, and the third LEDs emit light rays at a ratio of 1:1:1.

A fourth embodiment will be described with reference to FIGS. 17 and 18. A backlight unit and a liquid crystal display device according to the present embodiment differ from the second embodiment in configurations of first LEDs 260A and third LEDs 260C. The light emission surfaces of the first LEDs 260A, the second LEDs 60B, and the third LEDs 260C have the vertical dimension D (extending in the thickness direction of the light guide plate 51) similar to the second embodiment. Light emission surfaces 261A, 261C of the first LEDs 260A and the third LEDs 260C have a lateral dimension (extending in an extending direction of the light entering edge surface) that is greater than a lateral dimension of the light emission surfaces 61B of the second LEDs 60B. Other configurations are similar to those of the second embodiment and indicated by the same numerals as those in the second embodiment and will not be described.

According to such a configuration, compared to the second embodiment, in the distribution of the light exit amount of the backlight unit related to the first LEDs 260A and the third LEDs 260C, the light exit amount is relatively greater than that in the second embodiment in the two edge portions with respect to the Y-axis direction. In the second embodiment, when the LEDs 60A, 60B, 60C are turned on at a ratio of 1:1:1, the distribution of the light exit amount on the optical axis (the Y-axis) has a mountain form having a greatest value in a middle section (refer to FIG. 14) and a smallest value is about 40% smaller than the greatest value.

In the present embodiment, the light emission surfaces 261A, 261C of the first LEDs 260A and the third LEDs 260C are greater than those of the second embodiment. As illustrated in FIG. 18, the light exit amount is increased in the section close to the LEDs 260A, 60B, 260C and in the section far away from the LEDs 260A, 60B, 260C so as to reduce difference between the light exit amounts in the Y-axis direction in the backlight unit as a whole. The light guide plate group 51G includes three light guide plates 51 disposed on top of each other and includes the first light guide plate 51A and the third light guide plate 51C on outer sides. The first LEDs 260A and the third LEDs 260C emitting light towards the first light guide plate 51A and the third light guide plate 51C, respectively, have the light emission surfaces 261A, 261C. A dimension of the light emission surfaces 261A, 261C extending in the extending direction of the light entering edge surface 511 is greater than that of the light emission surfaces 61B of the second LEDs 60B that emit light toward the second light guide plate 51B disposed in a middle. According to such a configuration, a graph representing the distribution of the light exit amount has a form close to a flat form as illustrated in FIG. 18 and the backlight unit of this embodiment has uniform brightness as a whole.

Fifth Embodiment

Figure 19:
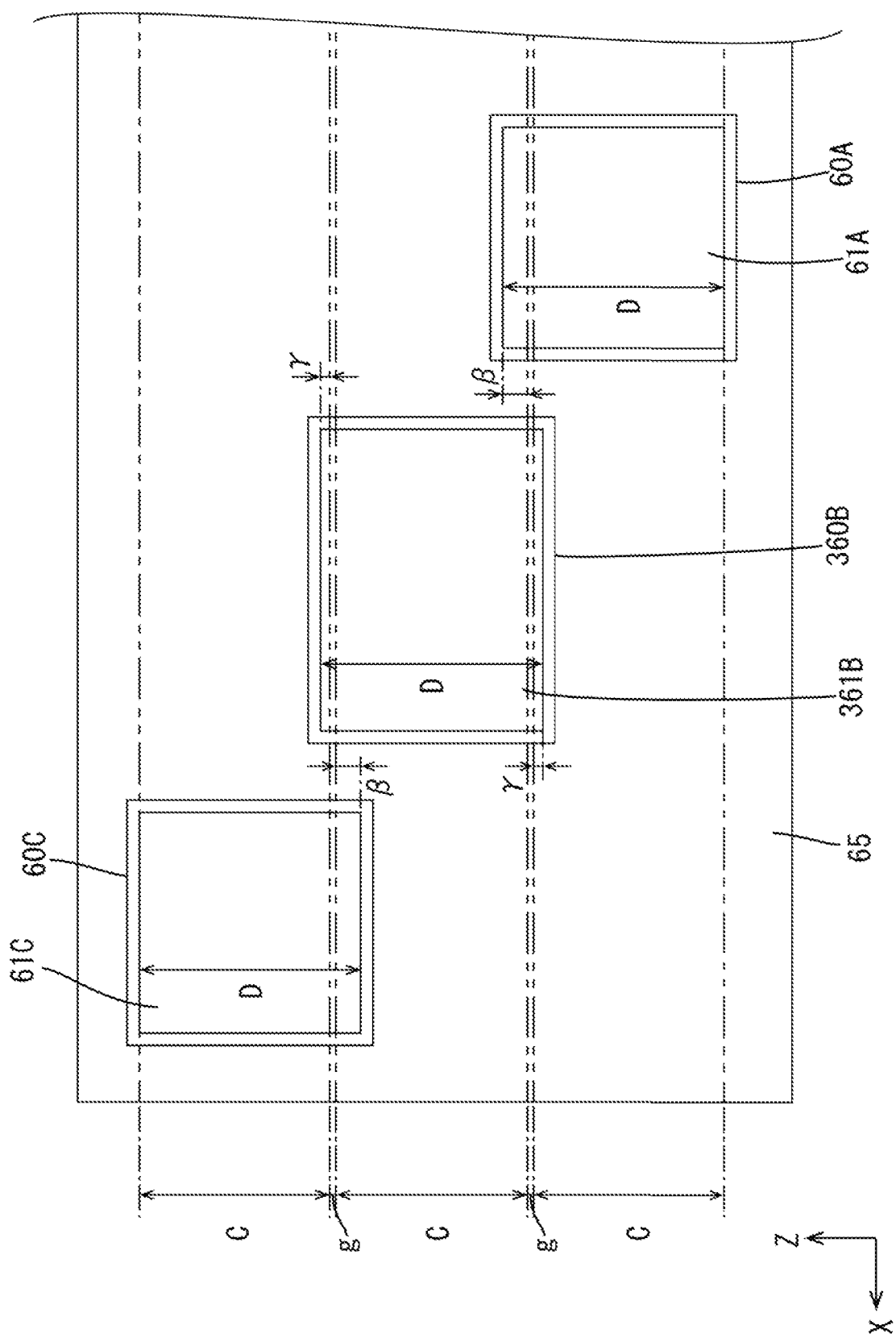
FIG. 19 is an enlarged plan view of a portion an LED board according to a fifth embodiment.
Figure 20:
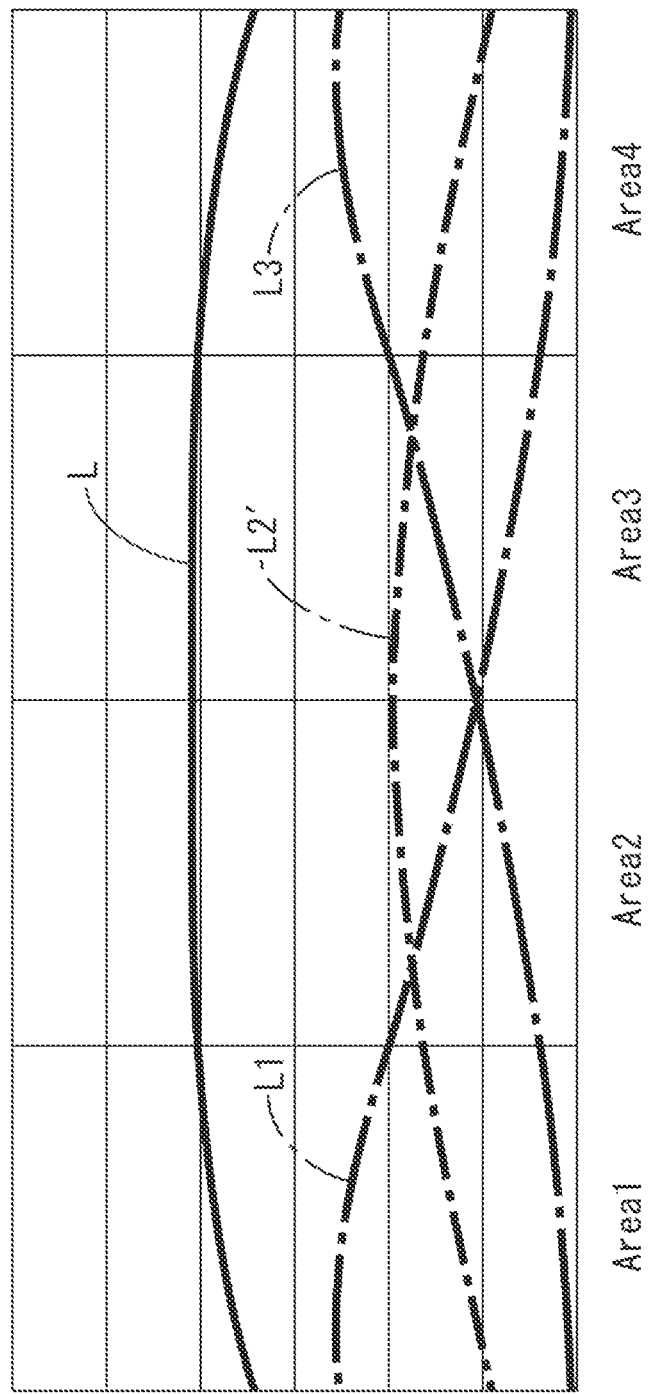
FIG. 20 illustrates graphs representing distributions of light exit amounts of light rays that exit the light guide plate group when the first LEDs, the second LEDs, and the third LEDs emit light rays at a ratio of 1:1:1.

A fifth embodiment will be described with reference to FIGS. 19 and 20. A backlight unit and a liquid crystal display device according to the present embodiment differ from the second embodiment in a configuration of second LEDs 360B. In the present embodiment the light emission surfaces of the first LEDs 60A, the second LEDs 360B, and the third LEDs 60C have the vertical dimension D (extending in the thickness direction of the light guide plate 51). Light emission surfaces 361B of the second LEDs 360B have a lateral dimension (extending in an extending direction of the light entering edge surface) that is greater than a lateral dimension of the light emission surfaces of the first LEDs 60A and the third LEDs 60C. The shape of the second light guide plate 51B related to the exiting of light rays is adjusted and the shape of the graph representing the distribution of the light exit amount of the second light guide plate 51B has a form closer to a flat form than that of the second embodiment. Other configurations are similar to those of the second embodiment and indicated by the same numerals as those in the second embodiment and will not be described.

Specifically, in the present embodiment, the light emission surfaces 361B of the second LEDs 360B have a lateral dimension greater than that of the light emission surfaces 61A, 61C and the shape of the second light guide plate 51B related to the exiting of light rays is adjusted such that the shape of the graph representing the distribution of the light exit amount of the second light guide plate 51B becomes closer to a flat form than the shape of the graph representing the distribution of the light exit amount L2 of the second light guide plate 51B of the second embodiment is. Accordingly, as illustrated in FIG. 20, the shape of the graph representing the distribution of the light exit amount L of the backlight unit in the Y-axis direction is much closer to a flat form. The light guide plate group 51G includes the three light guide plates 51 that are disposed top on each other and includes the second light guide plate 51B in a middle. The light emission surfaces 361B of the second LEDs 360B that emit light toward the second light guide plate 51B have a lateral dimension extending in the extending direction of the light entering edge surface 511. The lateral dimension of the light emission surfaces 361B is greater than that of the light emission surfaces of the first LEDs 60A and the third LEDs 60C that emit light toward the first light guide plate 51A and the third light guide plate 51C on the outer sides. According to such a configuration, the backlight unit of this embodiment has uniform brightness as a whole.

Other Embodiments

The technology disclosed in this specification is not limited to the embodiments described in the above and the drawings but the embodiments may be altered as appropriate.

(1) The light sources of the backlight unit do not necessarily have the above-described configurations. As illustrated in FIG. 21, light sources 130 may be arranged to face two opposite outer edges of a light guide plate group 121G to supply light to the two opposite edges of the light guide plate group 121G.

(2) In each of the above embodiments, the lower edges 311A1, 611AL of the light emission surfaces 31A, 61A of the first LEDs 30A, 60A are flush with the lower surface of the first light guide plate 21A, 51A. The upper edges 311BU, 611CU of the light emission surfaces 31B, 61C of the second LEDs 30B and the third LEDs 60C are flush with the upper surfaces of the second light guide plate 21B and the third light guide plate 51C, respectively. However, the first LEDs 30A, 60A and the second LEDs 30B and the third LEDs 60C may be on an inner side than the plate surfaces of the respective light guide plate 21G, 51G.

(3) In the first embodiment, the dimension of the light emission surface 31 extending in the thickness direction of the light guide plate 21 is 1.15 times as large as the thickness of the light guide plate 21; however, the ratio of the dimensions of light emission surfaces 31 and the light guide plate 21 may not be limited to the above ratio.

(4) In the above embodiments, the light guide plate 21, 51 includes the uneven pattern projecting toward the back side from the light exit opposite plate surface 214, 514. However, a light guide plate may include an uneven pattern or a scratch pattern recessed inwardly from a light exit opposite plate surface. In such a configuration, the clearance g is not present between the light guide plates and the relationships of $0<\alpha=B-A$, $0<\beta=D-C$, $0<\gamma=(D-C)/2$ are established.

The invention claimed is:

1. A lighting device comprising:
light sources having light emission surfaces through which light is emitted, the light sources including first light sources included in a first light source row and having first light emission surfaces and second light sources included in a second light source row and having second light emission surfaces; and
a light guide plate group including a first light guide plate and a second light guide plate that are disposed on top of each other in a thickness direction of the first light guide plate and the second light guide plate,
the first light guide plate including a first light entering edge surface that is opposite the first light emission surfaces of the first light sources and through which the light from the first light sources enters,
the second light guide plate including a second light entering edge surface that is opposite the second light emission surfaces of the second light sources and through which the light from the second light sources enters, and
the first light entering edge surface and the second light entering edge surface facing a same direction and extend in an extending direction, wherein
the first light source row and the second light source row extend in the extending direction and are arranged parallel to each other,
each of the first light emission surfaces and the second light emission surfaces has a vertical dimension extending in the thickness direction and the vertical dimension of the first light emission surfaces is greater than a thickness dimension of the first light guide plate and the second light guide plate and the vertical dimension of the second light emission surface is equal to or greater than the thickness dimension of the first light guide plate and the second light guide plate,
the first light sources and the second light sources are arranged alternately in the extending direction, and
portions of the first light emission surfaces are opposite the second light entering edge surface.

2. The lighting device according to claim 1, wherein the vertical dimension of the second light emission surface is greater than the thickness dimension of the first light guide plate and the second light guide plate, and portions of the second light emission surfaces are opposite the first light entering edge surface.

3. The lighting device according to claim 1, further comprising:
a light source board that is disposed opposite the first light entering edge surface and the second light entering edge surface and extends in the extending direction and on which the first light sources and the second light sources are arranged,
the light source board having a first long-side edge and a second long-side edge that extend in the extending direction and the first light source row extends near and along the first long-side edge and the second light source row extends near and along the second long-side edge, wherein
the second light guide plate is disposed on the first light guide plate and each of the first light emission surfaces has an upper edge and a lower edge and each of the second light emission surfaces has an upper edge and a lower edge, and
the upper edge of each of the first light emission surfaces is closer to the second long-side edge than the lower edge of each of the second light emission surfaces is.

4. The lighting device according to claim 3, wherein
the vertical dimension of the second light emission surface is greater than the thickness dimension of the first light guide plate and the second light guide plate,
portions of the second light emission surfaces are opposite the first light entering edge surface, and
the vertical dimensions of the first light emission surfaces and the second light emission surfaces are same.

5. The lighting device according to claim 1, wherein
the vertical dimension of each of the first light emission surfaces and the second light emission surfaces is equal to or smaller than 1.5 times the thickness dimension of each of the first light guide plate and the second light guide plate.

6. The lighting device according to claim 1, wherein
the second light guide plate is disposed on the first light guide plate,
the light sources further include third light sources included in a third light source row and having third light emission surfaces, the third light source row extends parallel to the first light source row and the second light source row,
the light guide plate group further includes a third light guide plate that is disposed on the second light guide plate and has the thickness dimension and a third light entering edge surface that is opposite the third light emission surfaces of the third light sources and through which light from the third light sources enters,
each of the third light emission surfaces has a vertical dimension extending in the thickness direction and the vertical dimension of the third light emission surfaces is greater than the thickness dimension, and
portions of the third light emission surfaces are opposite the second light entering edge surface.

7. The lighting device according to claim 6, wherein the vertical dimension of the second light emission surfaces is equal to the thickness dimension.

8. The lighting device according to claim 6, wherein
the first light emission surfaces and the third light emission surfaces have a lateral dimension extending in the extending direction that is greater than a lateral dimension of the second light emission surfaces.

9. The lighting device according to claim 6, wherein the second light emission surfaces have a lateral dimension extending in the extending direction that is greater than a lateral dimension of the first light emission surfaces and the third light emission surfaces.

10. The lighting device according to claim 1, wherein the light guide plate group includes a light guide group light entering surface including the first light entering edge surface and the second light entering edge surface, and the light sources are arranged opposite the light guide group light entering surface.

11. A display device comprising:
the lighting device according to claim 1; and
a display panel displaying an image with using light supplied by the lighting device.

\* \* \* \* \*